US006226792B1

(12) United States Patent
Goiffon et al.

(10) Patent No.: US 6,226,792 B1
(45) Date of Patent: May 1, 2001

(54) OBJECT MANAGEMENT SYSTEM SUPPORTING THE USE OF APPLICATION DOMAIN KNOWLEDGE MAPPED TO TECHNOLOGY DOMAIN KNOWLEDGE

(75) Inventors: David A. Goiffon, Shoreview; Gerald E. Hartmann, Minneapolis; David R. Johnson, Oakdale, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/173,095

(22) Filed: Oct. 14, 1998

(51) Int. Cl.[7] .................................................. G06F 9/45
(52) U.S. Cl. ........................... 717/11; 707/200; 717/3
(58) Field of Search ............................. 717/11, 3; 707/1, 707/200, 204, 574; 706/45

(56) References Cited

U.S. PATENT DOCUMENTS

| | | | | |
|---|---|---|---|---|
| 5,361,355 | * | 11/1994 | Kondo et al. | 395/700 |
| 5,493,682 | * | 2/1996 | Tyra et al. | 395/700 |
| 5,632,022 | | 5/1997 | Warren et al. . | |
| 5,933,646 | * | 8/1999 | Hendrickson et al. | 395/712 |
| 5,950,011 | * | 9/1999 | Albrecht et al. | 395/712 |
| 5,963,743 | * | 10/1999 | Amberg et al. | 395/712 |

OTHER PUBLICATIONS

Premkumar Devanbu et al. "LaSSIE: a Knowledge–based Software Information System" Mar. 26, 1990.
Peter G. Selfridge "Knowledge Representation Support for a Software Information System" Feb. 24, 1991.
Gerhard Fischer et al, "Cognitive Tools for Locating and Comprehending Software Objects for Reuse" May 13, 1991.

* cited by examiner

*Primary Examiner*—Kakali Chaki
*Assistant Examiner*—Wei Zhen
(74) *Attorney, Agent, or Firm*—Beth L. McMahon; Michael B. Atlass; Charles A. Johnson

(57) ABSTRACT

An object management system is providing for managing, cataloging, and discovering various potentially reusable code and data components that exist within an Information Technology (IT) platform, and which each have well-defined interfaces with other components. For each of these re-usable code and data components, an associated software object called an "asset element" is created that describes the associated component. Relationships are created between various asset elements to represent the relationships existing between the software components. Other software objects called "locator elements" are created that each describes an application concept or sub-concept. This application concept or sub-concept is associated with a problem solved by the code and data components within the IT platform. Relationships are created between the various locator elements to correlate the concepts and sub-concepts to software constructs represented by asset elements. The object management system further supports various object discovery tools capable of identifying locator elements associated with a particular concept. These locator elements and the associated relationships may then be efficiently traced to identify related asset elements and the associated software and code constructs. This provides an efficient concept-based search mechanism for the code constructs. Other tools are provided for creating, modifying, and deleting the elements. A model may be used to define the various types of relationships and elements that may exist within the system, thereby simplifying the various tools needed to support element creation, modification, deletion, and traversal.

7 Claims, 20 Drawing Sheets

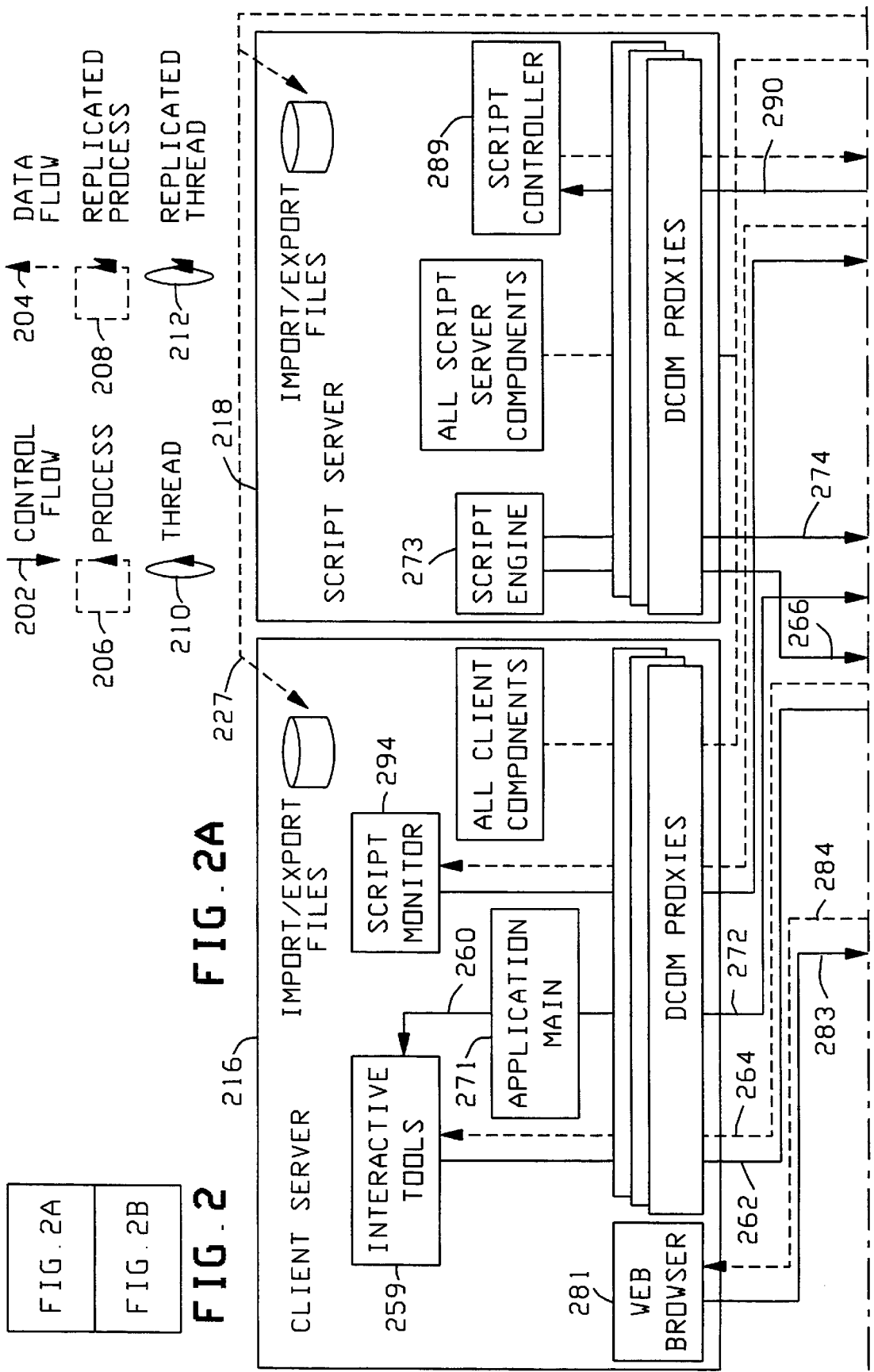

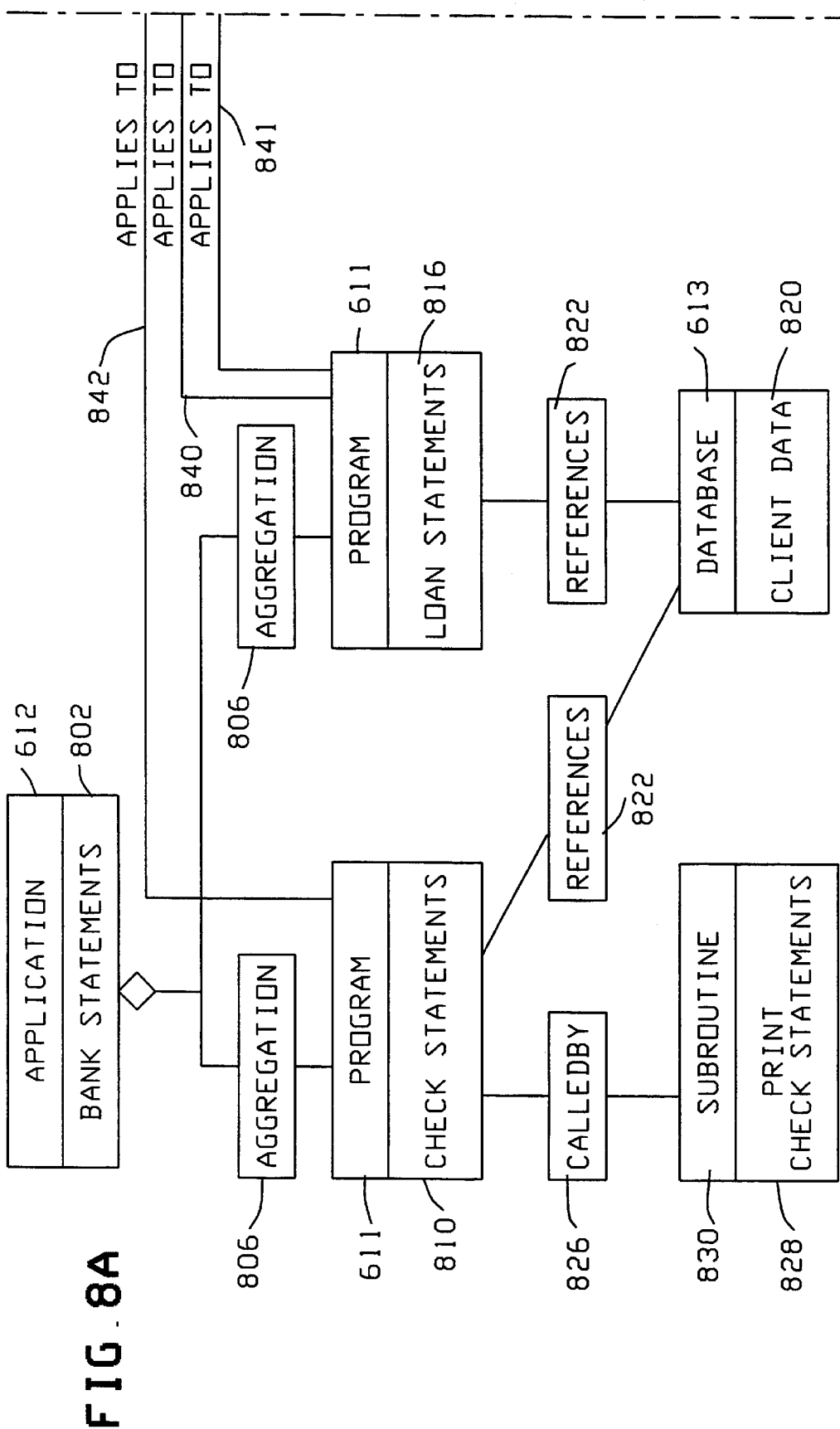

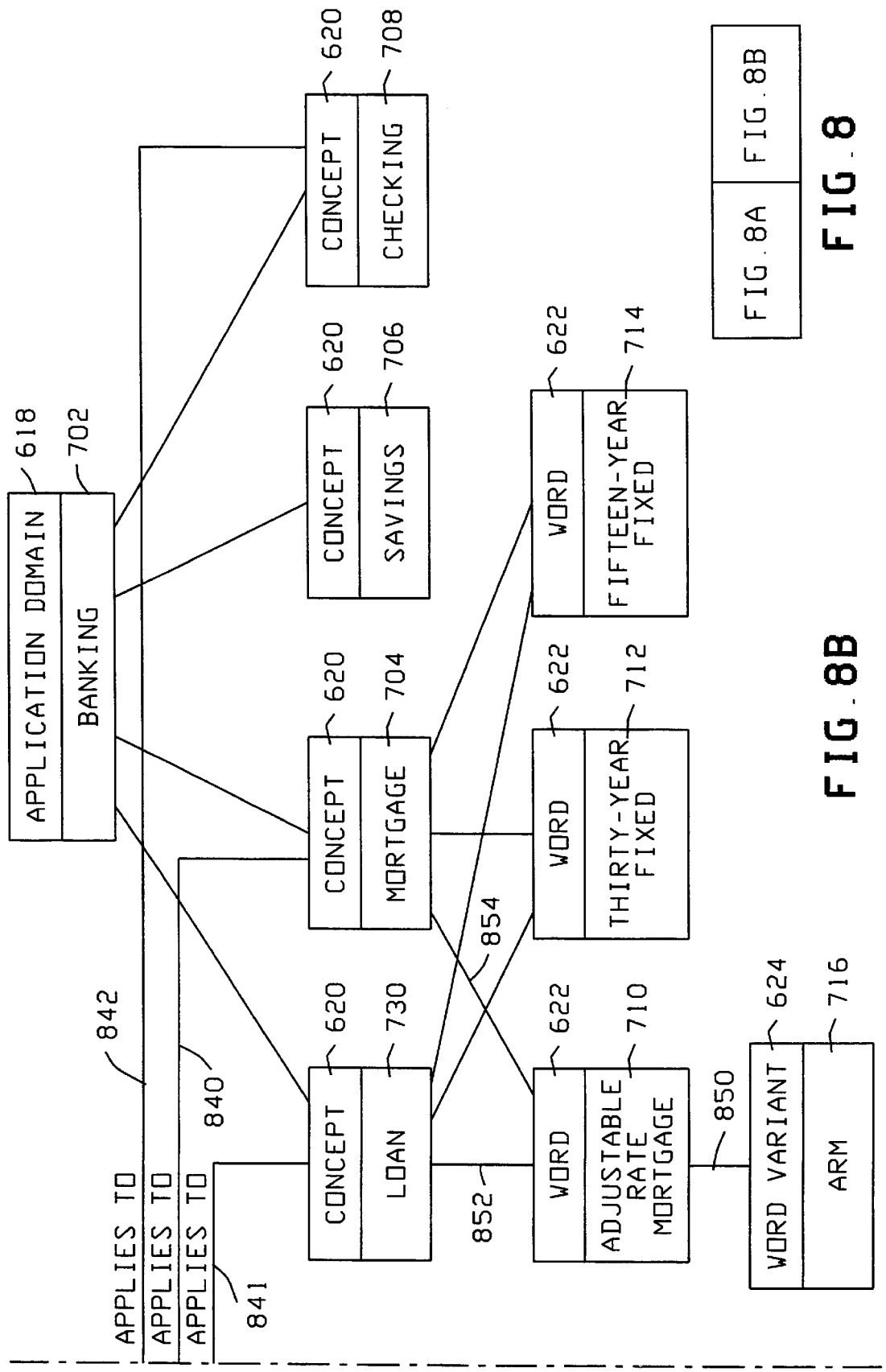

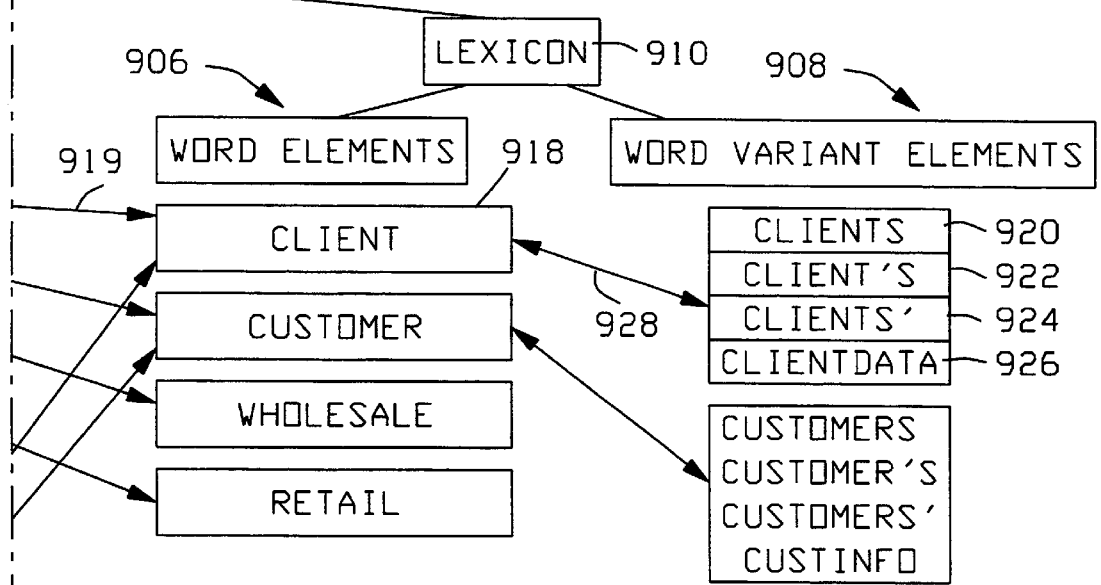
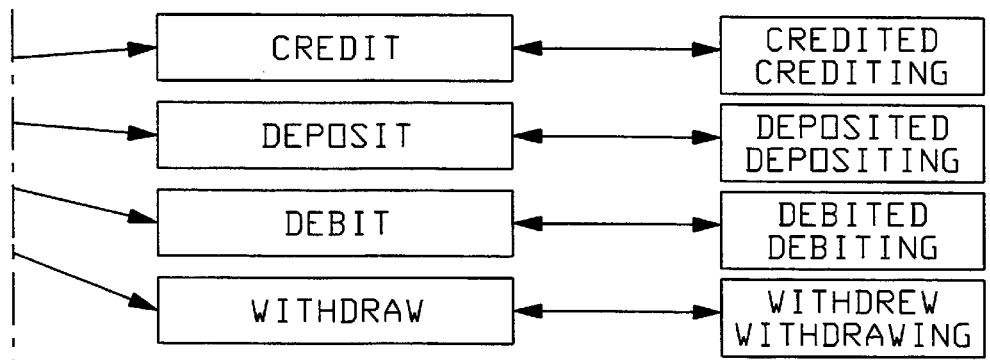
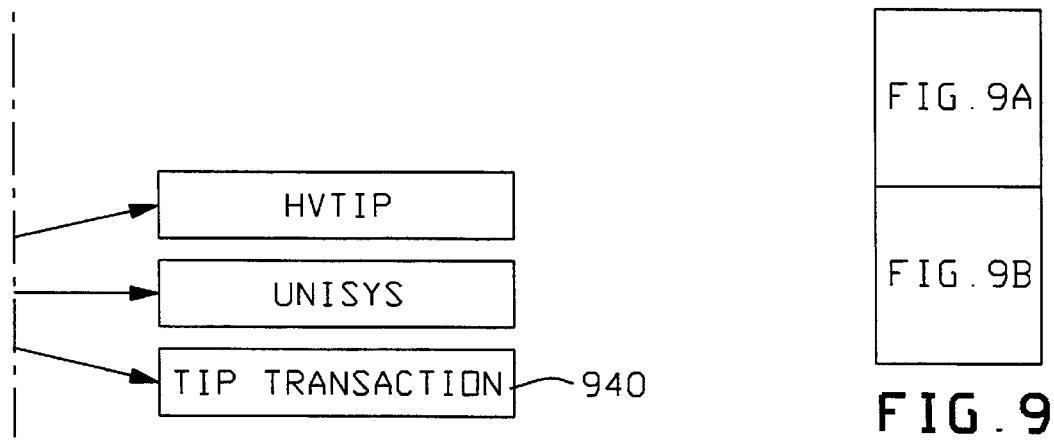
FIG. 9

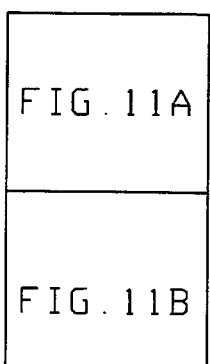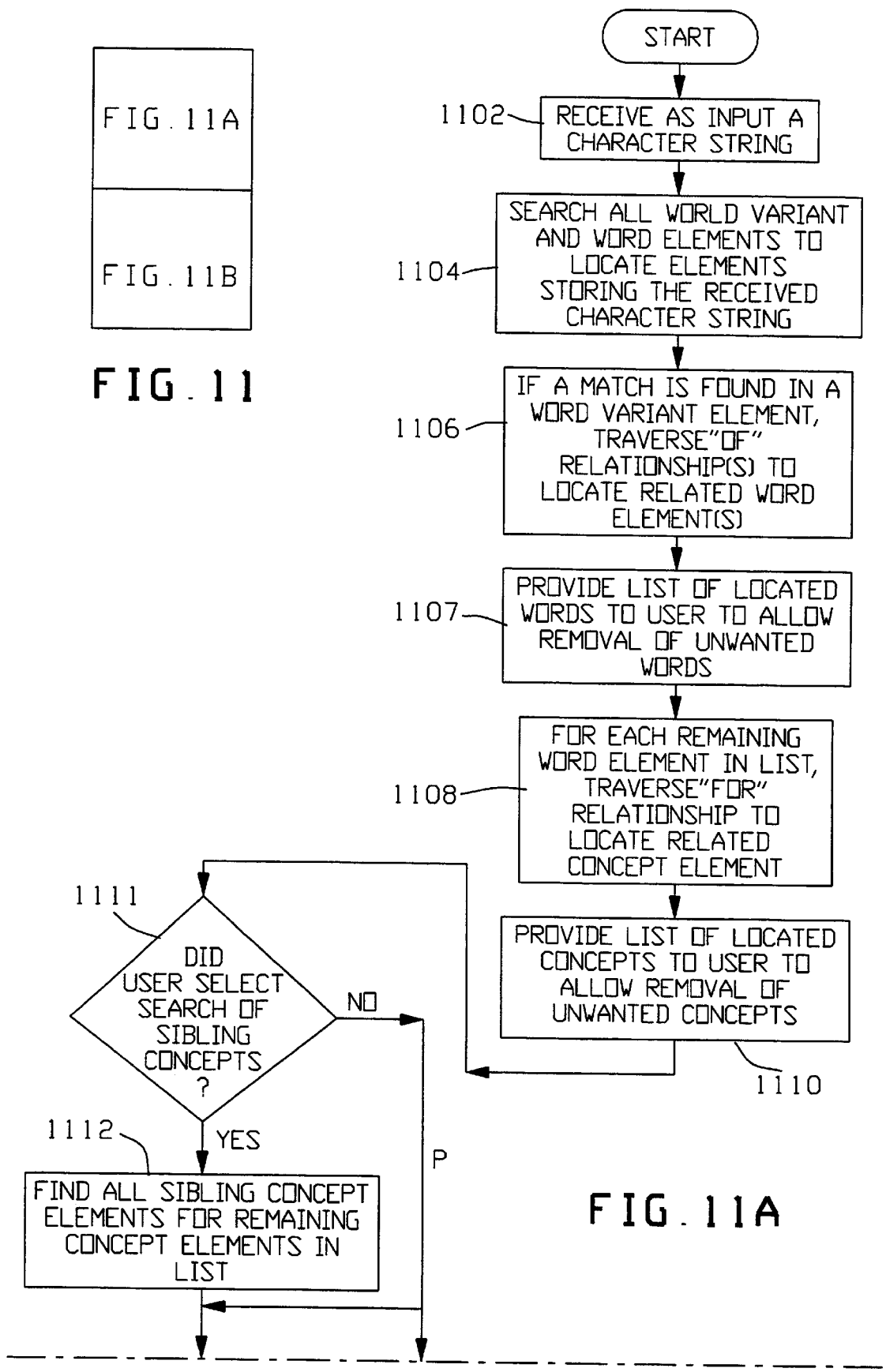

OBJECT MANAGEMENT SYSTEM SUPPORTING THE USE OF APPLICATION DOMAIN KNOWLEDGE MAPPED TO TECHNOLOGY DOMAIN KNOWLEDGE

CROSS-REFERENCES

This patent application is related to the co-pending U.S. patent application Ser. No. 09/172,423, entitled, "System and Method for Developing a Selectably-Expandable Concept-Based Search", filed on Oct. 14, 1998 concurrently herewith by Goiffon et al., which is assigned to the assignee of the present invention, and incorporated herein by reference in its entirety.

BACKGROUND OF THE INVENTION

1. Field of the Invention

This invention relates generally to an improved object management system for tracking, cataloging, and managing data and code components; and, more specifically, to an object management system that stores objects within a technology domain for modeling the data and code components, and objects within an application domain for modeling application-related concepts, and that further includes object relationships that map objects from the application domain to objects within the technology domain for use in cataloging reusable code and data components.

2. Description of the Prior Art

Many of today's software solutions are being designed using an object-oriented approach. According to this methodology, a design is broken into code components wherein each component is tailored to perform a discrete function on any data to which it is passed. If each component is designed to accomplish the function in a generalized, versus a task-specific, way, the components may potentially be reused to solve a different task. Using this type of approach, a large library of components can be developed which may be mixed and matched to solve a variety of problems.

Using object-oriented design methodology, each reusable code or data component has predefined interfaces or relationships to other components. As a simple example, consider a program component that includes instructions that reference data in a table. The program component might be described as having a relationship to the table component of "references". Within a large complex system, thousands of components and component relationships may be defined. Managing these components becomes a daunting task. For more information on object-oriented design methodology and the problems associated with component management, see "Object-Oriented System Development" by Dennis de Champeaux, Douglas Lea, and Penelope Faure, published by Addison Wesley, 1993.

Well-organized management of components and component relationships is essential if reuse of constructs is to be practical. This can be understood by considering a variety of situations in which groups of components must be identified. For example, assume a user makes a new version of a code component. Changes made to the code component may require that further modifications be made to related code components so that compatibility is maintained. Some method of identifying the related code components is needed. Preferably, this method of identification can be automated. Another related example involves the modification of a data component. For example, assume a component of the type "TableColumn", which is a column of a table, is deleted. This deletion will affect any table that includes the column, and will further affect any code component that references the affected tables. Again, some method is needed of easily identifying the affected components before the change is made and incompatibility results.

Another situation requiring the tracking of components and component relationships involves the porting of solutions to a new environment. Because computer technology is rapidly evolving, it often becomes desirable to transport a software solution from a first data processing platform to a second data processing platform to leverage the existing knowledge base. This type of "transformation" operation may require re-implementation of a portion of the existing code components into a different coding language, or may involve creating additional layers of code called "wrappers" to bridge the existing code interfaces to the new platform architecture. To make this type of porting operation more expedient, all code and data components associated with the targeted solution must be easily identifiable.

Still another example of a situation necessitating component tracking involves renovation operations. These types of operations involve updating code and data components to accommodate changing requirements. A good illustration of this type of operation involves updating code components to correctly handle dates occurring after Dec. 31, 1999. Another type of renovation effort is needed to allow software to handle the European Monetary Unit (EMU), or "Euro", which will become the common currency within many European countries within the next few years. Still other types of conversion are necessary when porting software between two machines that do not use the same word sizes. Software modification is further required when porting code to a machine having an expanded addressing space. These types of renovation efforts are generally performed on an identified solution, making it necessary to track all code and data components associated with a given solution.

The above-described objectives can be accomplished by tracking the various relationships existing between the components. As discussed above, object-based systems generally record relationships describing how code or data components of a particular type correlates to other components. For example, a code component may be said to "reference" a table component, or a table component may be said to "include" a column component. As another example, multiple code components may be "included" within part of a larger transaction management component. These types of relationships are described in terms of what the two related components are (e.g., a code module and a table.) It may be said these relationships, which are described in terms of software and data constructs and principles, are part of a "technology domain". That is, these mappings model software technologies as objects and object relationships.

Although the relationships existing within a technology domain may be adequate to identify groups of components for purposes such as those described above, other situations require a different knowledge base. To illustrate, assume a new development effort is initiated to design a particular application. It may often be desirable to identify existing components that are related to that effort so that some of these components can potentially be reused to create the new solution. For example, assume a new transaction management system is being developed to handle debit cards issued by a bank. It is useful to determine which code and data components are already in existence to handle banking transactions. To this end, it is helpful to track components based on the type of applications with which they are associated. This may be described as providing a mapping of components to applications within an "application domain". Thus, for example, a particular component may be mapped to the application "banking", or perhaps, more specifically, to "mortgages". The application mappings may then be used as a subject matter index when locating components.

While prior art object management systems may provide some type of a tracking mechanism related to application domain mappings, this mechanism is not related to, or interconnected with, a technology domain mapping As a result, two sets of mappings must be consulted when attempting to identify a set of components for a given purpose. For example, consider the case in which all banking applications are to be migrated from a first data processing platform to a second platform. Using some type of a first tracking system, a first check is made for all components mapped to application "banking" within the application domain. The resulting list of components may, and probably does, call other components that might be considered "general purpose", and which are not included in this list. Therefore, the technology domain mapping must be utilized to determine which other components have relationships to components in the first list so that the related components can be included on the list. Finally, the list must be processed to remove duplicate components. This processing requires two individual processing efforts and some type of cross-checking operation. This can be time-consuming, and can make development of an automated component identification mechanism more difficult. The process is complicated further if multiple application domain mappings may be possible. For example, if abbreviations or synonyms are used within the application domain to perform the mapping function, the above process must be repeated multiple times. A more efficient solution is needed wherein application domain mapping and technology domain mapping is integrated within a single object management system.

Processing can be further automated if the application-to-technology domain mappings are model-driven. A model defines, in a general-purpose way, the various object types and relationships types that will be used to represent the code and data components in the system. Each of the objects created according to the model stores "meta-data", or "data about data", that describes the code or data component represented by the object. This meta-data includes data describing the location of the modeled code or data component, and further includes one or more definitions that describe relationships with other software constructs represented by other objects. These relationships model the relationships between the actual code and data components The use of modeling in designing object-oriented code components is described further in the publication entitled "Object-Oriented System Development" referenced above.

OBJECTS

It is a primary object of the invention to provide an improved object management system;

It is another object of the invention to provide an object management system that includes an application domain mapping which is integrated with a technology domain mapping;

It is a further object of the invention to provide a model-driven object management system that is capable of mapping an application domain to a technology domain;

It is yet another object of the invention to provide an automated mechanism for discovering objects mapped to an application domain;

It is still another object of the invention to provide an automated mechanism for discovering objects mapped to a technology domain; and It is yet another object of the invention to provide a mechanism for performing Natural Language Understanding (NLU) searches to identify code and data software constructs existing within a data processing platform.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is an object management system for use in managing reusable code and data components. Management is performed by mapping "concepts" stored within an "application domain" to software constructs that exist with a "technology domain".

The object management system is used within an Information Technology (IT) department which owns various code, data, and system "assets" used to perform the work of the IT department. For example, a program could be considered a code asset, a database might be described as a data asset, and a resource such as a directory could be considered a system asset. For each of these re-usable assets, an associated construct is created within a repository to model the asset. This associated construct may be described as an "asset element". Each asset element stores meta-data, that is, "data about data", that describes the associated code, data, or system component, and that further describes the location of the component within the system. For example, the meta-data may include a server name and a directory path describing the location of the associated component. The meta-data further includes data describing relationships between the associated code, data, or system component and other related components. The relationships between components are modeled, and described, in terms of relationships that are created between the elements that represent the components.

Because the asset elements describe the relationships and dependencies existing between various types of software components such as programs, databases, tables, and the like, the asset elements may be said to map each of the components to a technology domain. The relationships that are represented by these asset elements may be traversed using automated means to identify software constructs that are inter-related. This is useful in performing analysis following code updates, and may also be utilizes when it is desirable to perform porting or renovation operations on a related group of code and data components.

The object management system further stores software objects that each includes information that identifies, or is associated with, a particular concept. These objects are referred to as "locator elements". According to the preferred embodiment, each of the locator elements stores information descriptive of an application, or business objective, performed by the code, data, and system modules. For example, these business objectives could include "banking", "airlines reservations", "government accounting", or other IT missions. The locator elements are said to define an "application domain" which describes an index, or catalog, of the types of applications that are addressed by the various code and data components existing within the system.

In a manner similar to that described above with respect to the asset elements, each of the locator elements stores data that describes relationships with other locator elements. These relationships create a hierarchical concept tree structure, wherein the locator elements are the nodes of the tree, and the relationships are the branches. The hierarchical tree structure categorizes the concepts represented by the locator elements into various classifications and sub-classifications. For example, a locator element describing a concept "banking" may have a "sub-concept" relationship with another locator element that stores the sub-concept "retail banking". The network of locator elements and element relationships may be easily navigated to search for natural language phrases and concepts.

According to the preferred embodiment of the invention, each of the locator elements residing in the hierarchical concept tree structure may further be related to elements storing string data. The collection of elements storing string data is said to make up the Lexicon of the system. The Lexicon may be searched using Natural Language Understanding (NLU) concepts to determine whether a user-specified character string is located in the Lexicon. If a string is included in the Lexicon, the relationships between an element in the Lexicon may be traversed to locate the related elements in the hierarchical concept tree structure.

Relationships may further be defined between various locator elements in the hierarchical concept tree structure and asset elements in a manner that is similar to the way in which relationships are formed between locator elements and other locator elements, and asset elements and other asset elements. These relationships may be created to connect various ones of the concepts described by locator elements to the asset elements that describe the associated code and data components. Because the various relationships defined between the elements may be easily traversed using standard tooling provided by the Object Management System, a user may to efficiently identify all code and data objects existing within the system that are associated with a particular concept or sub-concept. Thus the application-to-technology domain mappings allow NLU searches to be performed on the various code and data constructs within the platform.

According to one embodiment of the object management system, each of the elements in the system is created according to a predefined model that is also stored in the object management system. This model defines all element types and relationship types that can exist within the system. Any asset or locator element must exist as an instance of one of the predefined element types. Because the various automated element management routines can consult the model instead of the various element instances to gain information about potential element relationships, tasks such as element location is greatly simplified. This model also supports object management tools that allow users to manually create, modify, and delete asset and locator elements, and to form additional relationships between the elements.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIGS. 2A and 2B, when arranged as shown in FIG. 2, are a block diagram of the Object Management System within which the current invention operates;

FIGS. 8A and 8B, when arranged as shown in FIG. 8, is a block diagram showing an example of Application Domain mapping to Technology Domain Mapping;

FIGS. 11A and 11B, when arranged as shown in FIG. 11, are a flow chart of the process used by the Element Locator to traverse the element constructs during a search;

DETAILED DESCRIPTION OF THE PREFERRED EMBODIMENTS

System Environment

Figure 1:
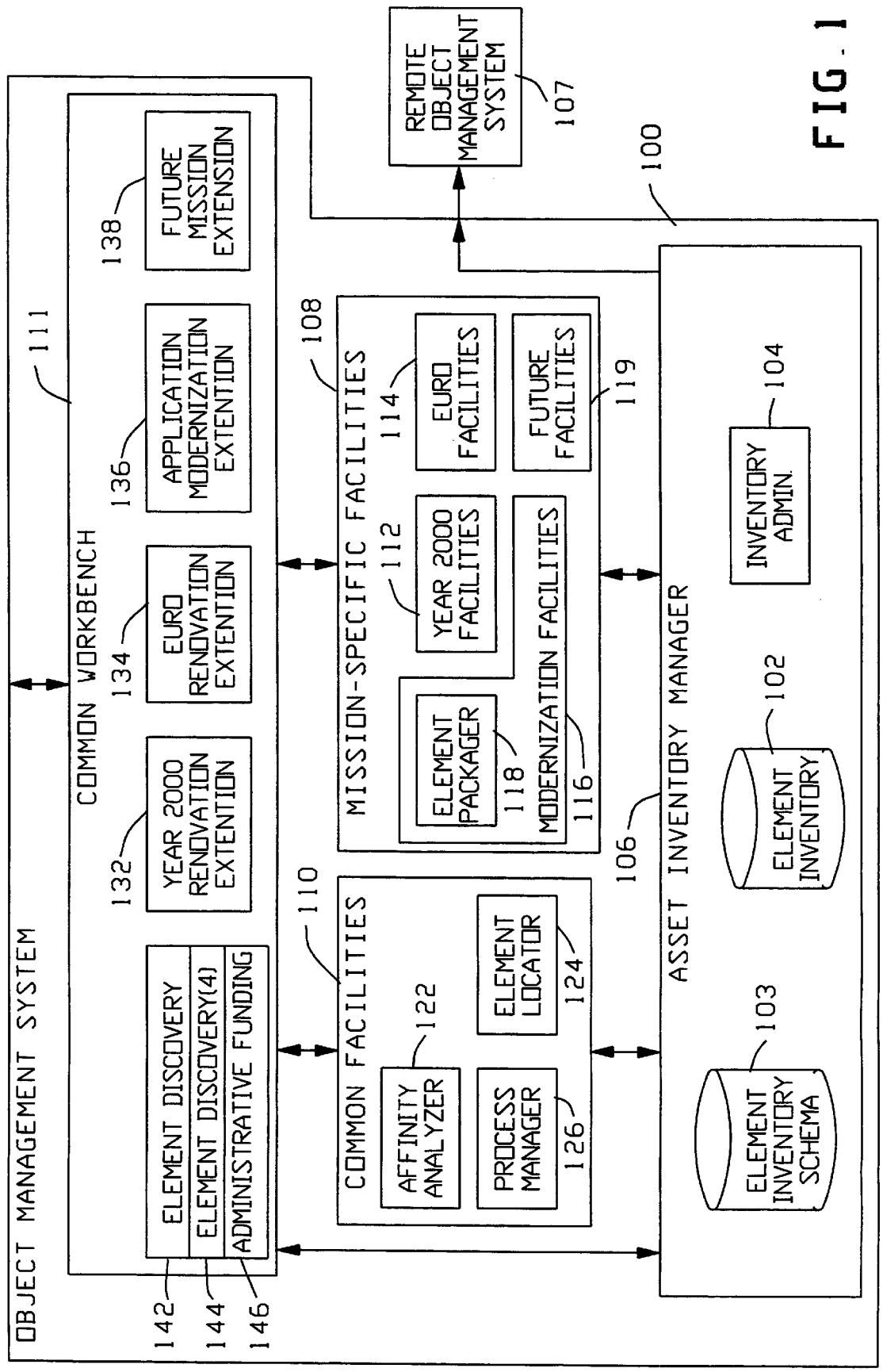
FIG. 1 is a block diagram of the major functional components of the Object Management System of the preferred embodiment.

FIG. 1 is a block diagram of the major functional components of the Object Management System 100 within which the current invention operates. The system includes Element Inventory 102, which stores the various objects, or "elements", that are used to manage the code and data components (not shown in FIG. 1) that support an enterprise. Each of the objects stores meta-data, or "data about data". This meta-data describes, among other things, the location of, and the type of data or code that is stored within the respective component or module residing elsewhere within the system. This meta-data also describes the various relationships that the respective data or code module has with other data and/or code modules. In this manner, the Element Inventory 102 serves as an index which points to, and describes, the various data and code resources used to perform the functions of the particular Information Technology (IT) platform which utilizes the Object Management System 100. The Element Inventory 102 may also include objects, or elements, that contain meta-data that points to and describes the processes and tools used by the Object Management System itself According to the preferred embodiment, each element within the Element Inventory 102 is associated with a respective pre-defined element type. Examples of element types may include "Table", "TableColumn", or "Program". These element types, which are recorded in a model associated with Element Inventory 102, are stored in the Element Inventory Schema (EIS) 103. The element type associated with a particular element is representative of the functionality of the associated data, code or system component. EIS further stores relationship types, which define how one element type is related to another element type. This will be discussed further below.

The Element Inventory 102 is supported using functions provided by Inventory Administration 104. These support functions include the backup facilities used to make a copy of selected elements, and restore facilities used to restore an existing saved copy of an element to the Element Inventory. The administration functions further include export and import operations provided to exchange information between the Element Inventories of one or more remote Object Management Systems such as that shown as Remote Object Manage System 107. The export function provides a copy of an element to the remote system, whereas the import function receives a copy of an element from a remote system, and stores the copy within the Element Inventory 102. Export/import exchanges are accomplished using self-defining intermediate file structures of the type utilized by various export/import standards such as extended Markup Language (XML).

Inventory Administration 104 further includes an archive function. This function is similar to the export operation in that it creates a self-defining intermediate file. Unlike the export function, which allows a copy of an exported element to remain within the Element Inventory 102, the archive function deletes an element from the Element Inventory while retaining an archived record of the element for possible later use.

The Inventory Administration 104 also supports a Migration Function. This function is utilized to copy an element and the corresponding inventory information pertaining to that a element between multiple Object Management Systems that are at different release levels.

The Element Inventory 102 and Inventory Administration 104 are managed by the Asset Inventory Manager 106. The Asset Inventory Manager (AIM) is the software that provides an interface to the Element Inventory 102 and Element Inventory Schema 103. One of the functions of the AIM is to hide the underlying repository implementation by providing an Application Program Interface (API) tailored for elements. The AIM provides an interface that supports the operations required by both the Mission Specific Facilities, shown in Block 108, and the Common Facilities, shown in Block 110.

The types of Mission-Specific Facilities shown in Block 108 may vary between Object Management Systems as required by the needs of the users. These include the renovation and transformation tools that are used to adapt existing software to changing user requirements. When tools are installed, they are registered in the Element Inventory 102. That is, for each tool, one or more elements are created that define each of the tools, and that define the types of relationships these tools may have with other code and/or data constructs within the system. Thus, the tools that are used by the Object Management System are inventoried in a similar manner to all other code and data constructs within the system.

New versions of tools may be installed over time. When this occurs, updated versions of the associated elements are also created and interrelated. The relationship between a version of a tool and elements created by the tool are also recorded in the Element Inventory. Tool administering functions are performed using the graphical user interface associated with the Common Workbench 111.

FIG. 1 illustrates some of the Mission-Specific Facilities, or tools, that will be commonly provided by the Object Management System 100 of the preferred embodiment, including the Year 2000 Facilities 112, the Euro Facilities 114, and the Modernization Facilities 116. The Year 2000 Facilities 112 contain the user interfaces, tools, protocols, and processes required to support analysis and renovation of applications to be ready for the year 2000. Euro Facilities 114 include the user interfaces, tools, protocols, and processes required to convert business applications into code which handles the new European Monetary Unit (Euro).

Mission-Specific Facilities 108 further includes Modernization Facilities 116. Modernization Facilities involves the user interfaces, tools, protocols, and processes that are required to integrate new applications with existing applications and/or to re-implement all or parts of existing applications within different systems and platforms, or using different software technologies.

Each of the Mission-Specific Facilities will generally be invoked on a group of related code and data components. To locate the related code and data components on which these Mission-Specific Facilities will be invoked, some type of element identification function must be invoked using the relationships defined within Element Inventory 102. In the current Object Management System 100, the relationships exist as integrated application and technology mappings so that code and data components can be discovered in a single, automated process. This greatly reduces the amount of time and effort required to perform this task, as will be discussed below.

After a group of code or data components have been identified as the target of some type of renovation or transformation operation, Element Packager 118 is utilized to build the identified elements into a package that includes all of the code and data necessary to transform the group of components. To perform this function, the Element Packager must extract additional information about each of the elements from Element Inventory 102.

After element packaging is completed, the Modernization Facilities 116 are used to perform some type of transformation operation on the element package. This may be accomplished by either wrapping all, or part, of an existing element package with layers of software called a "wrapper" that provide an interface bridge between the wrapped elements that makes that package accessible from a different operating environment. Alternatively, some of the elements in the package may be entirely re-implemented using a new technology.

The Mission-Specific Facilities shown in FIG. 1 are exemplary only. Still other types of tools could be included within the current Object Management System 100, including, but not limited to, facilities to migrate software to platforms having a different word size or address-space size. These are represented by Future Facilities 119.

Object Management System 100 further includes Common Facilities 110. These functions aid the user in understanding the relationships between elements, and also aid in invoking the tools used to perform the transformation and renovation operations. Common Facilities 110 include the Affinity Analyzer 122, which is a tool that analyzes the relationships existing between various elements contained within the Element Inventory 102. For example, the Affinity Analyzer determines which elements are involved in the processing performed to accomplish a particular function. The Affinity Analyzer 122 further provides a graphic display representing the various elements and element relationships for those code and data components provided by the IT platform. The graphical displays, which are capable of illustrating complex element networks, are used for advanced impact analysis and element packaging purposes. For example, before a particular code module is modified, the relationships existing between the associated element modeling that code module and other elements may be used to determine which other code or data components need to be modified to maintain compatibility. These relationships may be graphically depicted using the Affinity Analyzer 122. The Affinity Analyzer allows software analysts to interrogate and visually mine single or disparate sets of elements without having to understand the details of the elements or relationships. Query and exploration, hypothesis generation, and knowledge discovery routines eliminate the need to compose complex queries for investigating how various code and data components are structured or interrelate. In the preferred embodiment, the Affinity Analyzer is implemented using the Netmap tool commercially available from the Alta Corporation.

The Common Facilities 110 further comprises the Element Locator 124. This tool uses Natural Language Understanding (NLU) technology to locate potentially reusable elements in the Element Inventory 102. This makes the information stored in the Element Inventory more accessible to other environments since the details of Element Inventory structure do not have to be known from outside the local system. The Element Locator 124 is able to perform a very efficient "concept" search using application domain mappings stored in the Element Inventory 102. The Element Locator 124 is described in detail below.

Also included in the Common Facilities 110 is the Process Manager 126. The Process Manager provides a mechanism whereby a user can discover, inventory, and transform elements with a minimum number of keystrokes using scripted sequences of tool invocations called "plans".

A user accesses both Common Facilities 120 and the Mission-Specific Facilities 108 through a graphical user interface represented on FIG. 1 as the Common Workbench (Workbench) 111 In the preferred embodiment, Object Management System 100 is a web-based system having a "web-like" interface, although other types of interfaces, graphical or non-graphical, could be utilized. The Workbench 111 is shown providing selections for Year 2000 Renovation 132, Euro Renovation 134, Application Modernization 136, and any other additional future extension, shown as Future Mission Extension 138, that may be needed.

Also included in the Workbench 111 are functions that allow the user to manage, view, and report on the elements and element relationships existing within the Element Inventory 102. These tools include Element Discovery Functions 142. Element discovery refers to the process of initially creating elements and the relationships among elements in the Element Inventory. Generally, an Element Discovery Function will analyze a target group of software and data constructs and the interrelationships between these constructs. The Element Discovery Function will then automatically create elements associated with the code and data constructs. If the Object Management System is model driven, the Element Discovery Function 142 will utilize the various element type definitions stored within the model, for example, "program" or "database", to create the elements. As discussed above, each of these elements includes meta-data that describes the location and function of the associated code or data element. This meta-data will further describe the relationships that an element has with other elements, wherein each element relationship models the relationship between the associated code or data construct and other code or data constructs represented by the related elements. The Element Discovery Function will generally create a group of elements that may then be stored within the Element Inventory 102, and which then become available as part of the system knowledge base to manage the associated code and data components.

A wide variety of vendor tools are available to perform Element Discovery Functions 142. For example, the Fulcrum tool commercially available from the RMC Corporation is capable of automatically analyzing Cobol code constructs and related data structures. This tool must be synchronized with the element types included within a model and stored within the Element Inventory Schema 103. This synchronization allows Fulcrum to create elements having recognized element types and relationship types, and that are consistent with other element types used within the system. Many other types of tools are available for analyzing code and data constructs of various other types of software languages. The type of Element Discovery Functions 142 which are available within a given Object Management System 100 will vary depending on the types of IT functions and technologies that are supported by that system.

Once elements and element relationships are created and recorded within the Element Inventory 102, the related code and data entities can be managed, and become available as potential building blocks to form larger applications. Element Locator 124 can be used to locate groups of elements associated with a particular application or applications so that one or more of the Mission-Specific Facilities can be performed on the element group. The identified elements may then be provided to the Element Packager 118 to be packaged prior to being operated on by the Modernization Facilities 116 in the manner discussed above. Element Locator 124 operates using the technology and application domain mappings that will be described in detail below.

The system further includes several element view functions shown collectively as Element Viewer 144. Element Viewer allow a user to see the elements and element relationships that are stored within Element Inventory 102, and in some cases may be used to create new relationships between existing elements. Four main view functions, or "views", are provided by the Element Viewers 144. The first view, which provides the default view of Object Management System 100, is the Element Explorer View. This view informs the user of the elements/element type matchings. (For example, the view will inform a user that an element is of the element type "TableColumn", "Table", or "Program".) This view allows a user to specify a particular element type as defined within the EIS 103, and in response, provides a list of all of the elements stored within the Element Inventory 102 that are of the type specified. This view further allows a user to create a new element using a selected element type. When a new element is created, memory is allocated within Element Inventory 102. The user can then manually enter the meta-data that will be stored in the new element. For example, the user may enter the location of the associated code, data, or system component, and may manually enter the relationship information that will relate the newly-created element to other elements. Element creation will be discussed further below.

From the default Element Explorer View, the user is able to select one of the other views, including the Properties View, Relationships View, or Affinity View. The Properties View enables the user to view the list of attributes associated with a selected element or element type, and which are stored within the Element Inventory 102. Attributes provide additional information about the code and data module associated with, and described by, the selected element, as will be described further below. The Relationships View is a graphic illustration of the relationships existing between a selected element and other elements, or between a selected element type and other element types. This view further allows a user to create new relationships for that element. This will be described further below. In comparison to the Relationships View, the Affinity View provides a more distant view of a chain of related elements. The Affinity View takes as input a user-provided starting element or element type and an ending element or element type, and displays the starting element, the ending element, and all elements and element relationships which provide the chain, or "slice" of interconnections leading from the starting element to the ending element. A similar view is provided between a specified starting element type and a specified ending element type. The relationships which are provided in these views represent relationships between software constructs that exist within the technology domain mappings as will be described below.

Workbench 111 further provides Administration Functions 146 to administer the Element Inventory.

Object Management System Subsystems and Interfaces

Figure 2B:
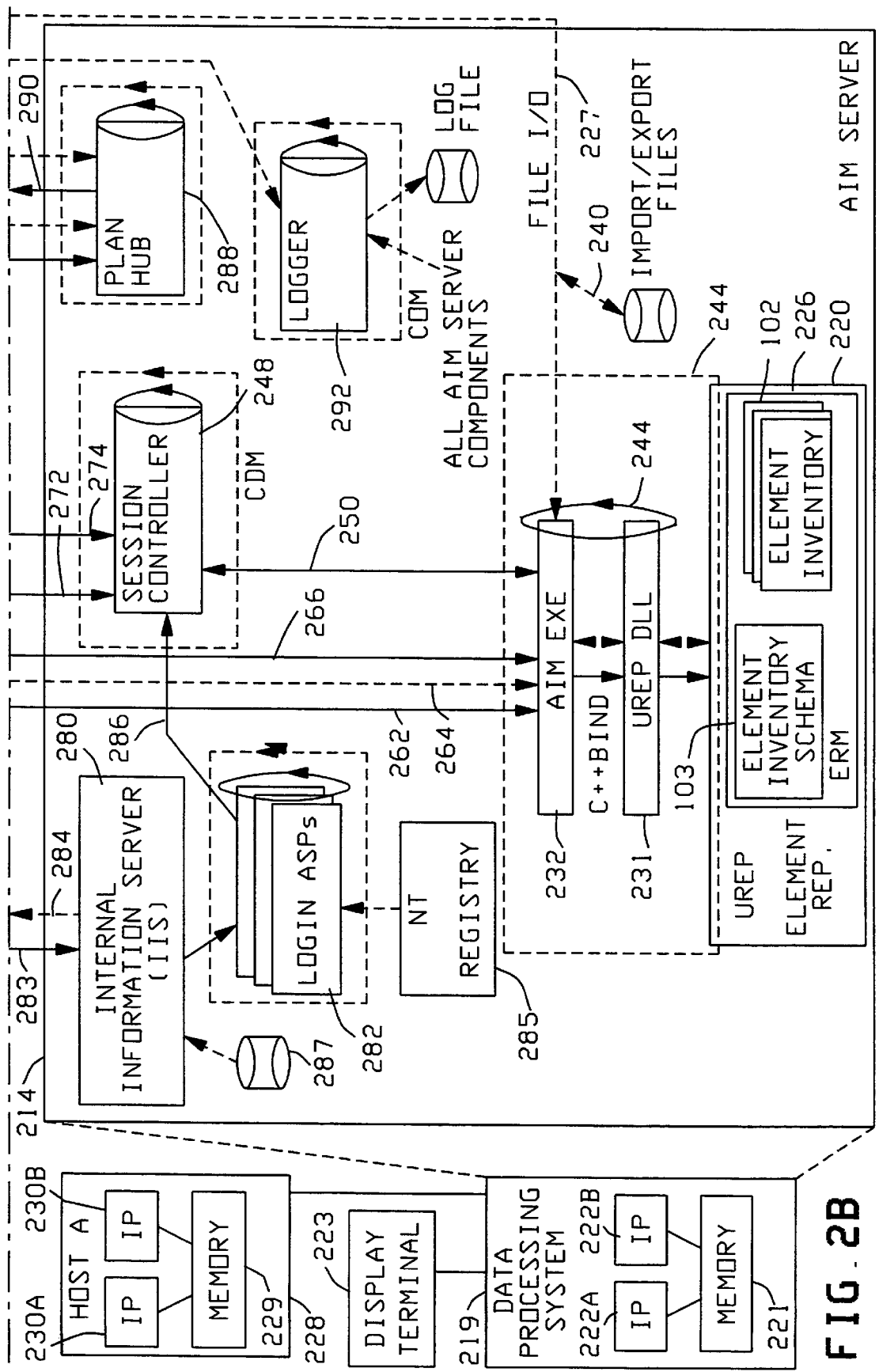

FIGS. 2A and 2B, when arranged as shown in FIG. 2, are a block diagram of the preferred embodiment of the Object Management System within which the current invention operates. In this diagram process control flow is represented by a solid arrow, and data flow is represented by a dashed arrow, as shown by control flow indicator 202 and data flow indicator 204, respectively. It may be noted that in FIG. 2, any of the dashed arrows representing data flow indicators are implemented as network interconnections. A dashed box with an arrow represents a process, and a dashed box with a double arrow represents a replicated process, as shown by process and replicated process indicators 206 and 208, respectively. A solid loop with an arrow represents a thread, and a solid loop with a double arrow represents a replicated thread, as shown by thread and replicated thread indicators 210 and 212, respectively.

The functionality embodied within Object Management System can be physically divided into three servers, the Asset Inventory Manager (AIM) Server 214, the Client Server 216, and the Script Server 218. The AIM Server 214 supports the Element Inventory 102, Inventory Administration 104, the Asset Inventory Manager 106, the Mission-Specific Facilities 108, and the Common Facilities 110 shown in FIG. 1. The Client Server provides the user interface to AIM Server 214, and supports the Common Workbench 111 of FIG. 1. Finally, the Script Server 218 supports execution of various scripts that are used to execute the scripted plans described above in reference to Process Manager 126.

The software constructs shown as AIM Server 214 reside on a data processing system such as that shown in FIG. 2 as Data Processing System 219. Data Processing System 219 includes Memory 221 intercoupled to one or more Instruction Processors (IPs) shown as IP 222A and IP 222B. Data Processing System 219 has one or more user interfaces such as Display Terminal 223. Client Server 216 and Script Server 218 may reside on the same Data Processing System 219, or on similar data processing systems (not shown) intercoupled to Data Processing System 219 via network interconnections. In an alternatively embodiment, Object Management System has multiple Client Servers 216 and multiple Script Servers 218.

The AIM Server

AIM Server 214 includes Element Repository (ER) 220, which is the repository that stores and manages persistent objects (elements). ER 220 may be implemented across multiple hosts interconnected by a remote interface. In the preferred embodiment shown in FIG. 2, the ER is implemented using the Unisys Universal Repository (UREP) commercially available from the Unisys Corporation, although other types of repositories could be utilized including, but not limited to, a Microsoft Repository commercially available from the Microsoft Corporation. Unisys Universal Repository (UREP) is a fully object-oriented repository for providing access to, concurrent sharing of, and immediate update support of all objects stored within the repository. For more information on the UREP system from Unisys, see the UREP Technical Overview, Document Number 8807 6971-000 available from the Unisys Corporation, and which is incorporated herein by reference in its entirety.

In the preferred embodiment, the Element Repository 220 is loaded with the Element Repository Model (ERM) 226. The ERM is an object model which defines objects within ER 220 used to store the element types, relationship types, elements, and relationships.

Within the ERM, the model that defines the various element types is called the Element Inventory Schema (EIS) 103, as discussed above. This model is installed in the Element Repository at system installation time, but may be varied throughout the life of the system. The model definition may be specific to a particular Object Management System. The Element type definitions within EIS 103 provide the templates used during element creation, and define the type of information contained in, the attributes associated with, and the relationships existing between, the elements.

In addition to the EIS, the ERM further contains the Element Inventory 102. The Element Inventory, which is discussed above in reference to FIG. 1, is the collection of elements, each of which is an object storing meta-data about other code, data, or system entities residing elsewhere. This meta-data describes, either directly or indirectly, where the respective entity resides (for example, which directory and server stores the entity). It may be remembered that numerous network interconnections exist within the current Object Management System, and each are depicted by an instance of data flow indicators 204. Any of these network interconnections may interface to another server storing code, data, or system modules represented by the elements stored in Element Inventory 102. For example, FIG. 2 shows a network interconnection represented by Line 224 connecting a Host A 228 to Data Processing System 219. Host A 228 includes Memory 229 which stores code and data modules. Memory 229 is interconnected to one or more IPs shown as IP 230A and IP 230B for executing instructions, and for aiding in the development of, and the execution of, any of the code and/or data modules. Multiple hosts of the type represented by Host A 228 may be interconnected to Object Management System 100 so that data, code or system modules developed and stored on the host may be managed and cataloged by Object Management System. Alternatively, a host such as Host A 228 that is managed by Object Management System 100 need not be interconnected to Object Management System 100. In that case, any information exchange being conducted between the two systems would occur via a tangible medium (such as by tapes.)

The meta-data included in each of the elements of Element Inventory 102 further describes the relationships the element has with other elements. As discussed above, these relationships model the relationships the associated data, code or system module has with other modules. In the preferred embodiment, the types of meta-data stored within a particular element, as well as the types of relationships that may be created for a particular element, are dictated by the element type associated with the element. The definitions for element types are stored within the model in the EIS 103. This is discussed in detail below.

The Element Repository is accessed using the UREP Dynamic Link Library (DLL) 231. This DLL provides programmatic access to objects stored in ER 220, including objects of ERM 226.

The UREP DLL 231 interfaces with the Asset Inventory Manager Executable (AIM EXE) 232. The AIM EXE implements the Asset Inventory Manager 106 function of FIG. 1. As discussed above, one of the functions of the AIM EXE 232 is to provide an interface to the Element Repository 220 that hides the underlying repository implementation. For example, the services provided by the AIM EXE hide the functions provided by the UREP DLL 231. The AIM EXE further masks the user from any transaction management and database locking that is required to accomplish a given task. The AIM EXE does so by providing an Application Program Interface (API) that supports the operations required by the entities accessing the various elements stored within the Element Inventory 102.

The following services are provided by the AIM EXE. Various ones of these services are called by the Element Discovery Functions 142, and Element Viewers 144 to perform the tasks discussed above:

- Connect: This service connects the session to the Element Repository. This service further opens the repository, makes a repository log entry in the newly created object, and begins a UREP session.
- Disconnect: This service disconnects the session from the Element Repository. In the preferred embodiment, this is accomplished by ending the UREP session and closing the repository. This service is called with a parameter that indicates whether uncommitted changes should be discarded. If uncommitted changes exist which are not to be discarded, the request for this service is disregarded.
- Export Element Types: This service reads element types from the EIS 103 and writes them into a file in a predetermined format as shown by dashed line 227. In the preferred embodiment, this format is XML. This service is called by scripts which execute on the Script Server 218.
- Import Element Types: This service reads element types from a file and writes them into the EIS 103 in a predetermined format, which in the preferred embodiment is XML format, and is shown by dashed line 227. This service is called by scripts that execute on the Script Server 218. The element types are installed at initialization time, and may be updated as desired during the life of a system.
- Get Element Types: This service reads element types from the EIS 103 and returns them to the caller in an output parameter. In the preferred embodiment, the output format is XML.
- Put Element Types: This service reads element types from an input parameter and writes them to the EIS 103. In the preferred embodiment, the input format is XML.
- Export Elements: This service reads elements from the Element Inventory 102 and writes them into a file as is indicated by dashed line 240. This service is called by scripts executing on either the Client Server 216 or the Script Server 218.
- Import Elements: A service which reads elements from a file and writes them into the Element Inventory 102 as indicated by dashed line 240. This service includes options for handling already-existing elements, including the Ignore, Overwrite, and Create New Version options. This service is called by scripts executing on either the Client Server 216 or the Script Server 218.
- Get Elements: A service that reads elements from the Element Inventory 102 and returns them to the caller in an output parameter. This service is called by various ones of the Interactive Tools 259. The element that is to be retrieved may be specified according to an element name, or may be specified using relationship data used to address a particular element within the Element Inventory. Another option for this service allows an element to be specified for retrieval according to a particular character string that the element stores.
- Get Element for Update: A service called by various ones of the Interactive Tools. This service sets an update lock on an element for a particular session, then reads the selected element from the Element Inventory 102 so that it is returned to the requester as an output parameter. The selected element may be specified by element name, or may be specified using relationship data used to address an element within the Element Inventory. Another option allows the selected element to be specified according to particular character string that the element stores.
- Create Elements: A service called by the Interactive Tools, and that provides elements as input parameters so that they can be written to the Element Inventory 102.
- Update Element: A service called by the Interactive Tools 259 for providing elements as input parameters so that they can be written to the Element Inventory 102. This service must be preceded by a call to "Get Element for Update" service.
- Delete Elements: A service called by the Interactive Tools 259 that deletes specified elements from the Element Inventory 102.
- Get BLOB: A service called by Interactive Tools 259 which reads a Binary Large Object (BLOB) attribute from an Element in the Element Inventory 102 and writes it into a file. The file can reside on a remote host, specified by a Universal Naming Convention (UNC) name.
- Get BLOB for Update: A service called by Interactive Tools which sets an update lock for this session on a BLOB Element in the Element Inventory 102, reads its BLOB attribute, and writes the BLOB attribute into a file. The file can be on a remote host, specified by UNC name.
- Update BLOB: This service, which is called by the Interactive Tools, reads a BLOB from a file, and writes the BLOB as an attribute of a BLOB Element in the Element Repository 102. The file can be on a remote host, specified by UNC name. This service call must be preceded by Get BLOB for Update.

Save: A service which commits all uncommitted changes to the Element Inventory 102. When invoked from interactive session, this service also saves a description of the state of the Common Workbench 111, including the state for any executing Interactive Tools.

Undo Last: A service that rolls back the last uncommitted change to the Element Inventory 102. This service may be called by either Interactive Tools 259 or by scripts.

Undo All: This service rolls back all uncommitted changes to the Inventory, if any such uncommitted changes exist. This service may be called by either the Interactive Tools 259 or scripts.

An instance of the AIM EXE 232 is created for each session that is active on the AIM server. If multiple sessions are active, multiple instances of the AIM EXE will be active at once. This is indicated by the replicated process indicator 244.

Creation of the AIM EXE 232 is performed by the Session Controller 248 as is indicated by control flow indicator 250. Creation of the AIM EXE invokes the "Connect" service to establish a session with the Element Repository 220. A session is ended when the Session Controller 248 calls the AIM EXE "Disconnect" service.

In the preferred embodiment, the Session Controller 248 is an NT service that is started automatically at AIM Server boot-up or manually by the administrator. The Session Controller is responsible for generating begin and end session requests in response to user requests received from Application Main 271 to log in and log off the Object Management System, respectively. These requests are represented by control flow indicator 272. Such requests may also be received by the Session Controller 248 from script execution on Script Engine 273, as shown by control flow indicator 274. The Session Controller is also responsible for receiving administrator requests to terminate orphaned sessions by destroying orphaned COM objects.

The browser-level client interface to AIM Server 214 is provided by the Internet Information Server (IIS) 280. In the preferred embodiment, IIS 280 responds to requests from Web Browser 281 by delivering login Active Server Pages (ASPs) 282 to the user for allowing login functions to be performed. The requests are represented by control flow indicator 283, and the IIS responses are represented by data flow indicator 284. IIS returns an HTML page which displays the names of the Object Management Systems if more than one system is available to the user, and further directs the user to the URL of the selected login form ASP. The URLs for the login form ASP is obtained from NT Registry 285, which stores system persistent data such as system names and ASP URLs that cannot, or should not, be held in the Element Repository 220.

A login form ASP returns an HTML page to the client. This ASP contains a form in which the user enters login information such as a user id and password. The user is then directed to the Login Request ASP, which sends the entered information to the Session Controller 248 for validation, as shown by control flow indicator 286. If a session is not successfully created for the user, an HTML page is returned to the client requesting that the information be reentered. Otherwise, a session is established.

Once a user is logged in, the client-side application files for the Object Management System are downloaded from Mass Storage 287 to the Client Server 216, and Application Main 271 on Client Server begins execution. Thereafter, further communication between Client 216 and AIM Server 214 is performed via the Session Controller 248 using Distributed Component Object Module (DCOM) protocol, as shown by control flow indicator 272.

The AIM Server 214 further includes Plan Hub 288, which acts as a central router for script execution requests and script execution status. The Plan Hub receives requests for script execution from the Client Server 216, and forwards these requests to a specified Script Controller 289, which is the process executing on Script Server 218. These requests are represented by control flow indicator 290. As an NT service, the Plan Hub process is started automatically when the AIM Server is booted, and may also be started manually by a system administrator.

AIM Server 214 also includes Logger 292, which is an NT service that receives script execution status from Script Controller 289 so that this status can be recorded.

Client Server

Turning now to a description of the Client Server 216, a user establishes a session with the AIM Server by invoking the URLs of Login ASPs using Web Browser 281. The user receives HTML login pages and application files from IIS 280. Once a user is logged in and a session is established for the user, communication between client and server is via DCOM, although the browser session is maintained.

Application Main 271 is the main client-side process supporting the object management functions. As an executable, the process for Application Main is started at creation. Application Main provides for the start-up of the individual Interactive Tools 259 via the interface shown as Line 260. Application Main further has access to ones of the global services such as Save, Undo, and Logoff, which are provided by the AIM EXE 232.

Invocation of Interactive Tools 259 by Application Main starts each of the Interactive Tools at its logical starting point. These tools call services provided by the AIM EXE to perform functions such as retrieving element type definitions from the EIS 103, retrieving element data from the Element Inventory 102, making requests for the creation of new elements according to the EIS model, or making requests to modify existing elements. These requests are shown in FIG. 2 as Control Flow Indicator 262 and Data Flow Indicator 264. A new thread is started when one of the Interactive Tools 259 begins communicating with the AIM EXE 232. When a request from Interactive Tools 259 is processed successfully by AIM EXE, notification of changes to data in the ER 220 is returned by the AIM EXE 232 via Session Controller 248 to Application Main 271, which then forwards the notification to Interactive Tools 259 via the interface shown as Line 260.

Script Server

The AIM EXE 232 further communicates with Script Server 218. Within Script Server 218, Script Controller 289 accepts requests from the Plan Hub 288 to execute a Plan, which is a scripted invocation of services provided by AIM EXE 232, and/or programmatic tool invocations. In response, the Script Controller reads a requested scripted plan, which is stored as an element in the Element Inventory 102, via the AIM EXE 232 as indicated by control flow 266. Thereafter, Script Controller 289 forks a process in which the plan is executed by Script Engine 273. The Script Controller further sends periodic notifications to the Plan Hub 288 to report on the script execution status. Upon termination of the script, the Script Controller writes an element that is a plan completion record to the Element Inventory 102 and notifies the Plan Hub.

Detailed Description of the Element Inventory Schema and Domain Mappings

Figure 3:
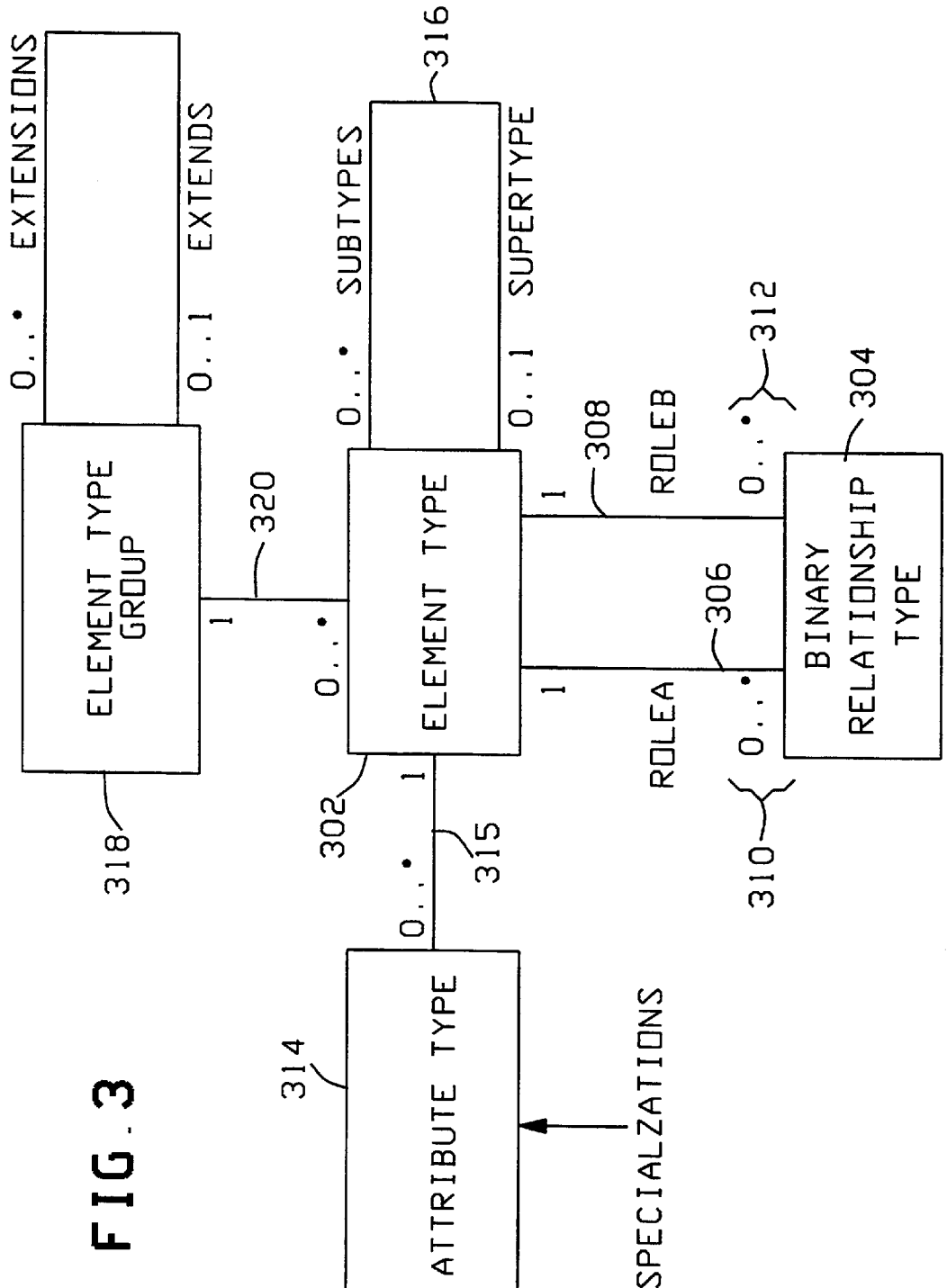
FIG. 3 is a block diagram of the generalized model for the Element Inventory Schema (EIS)

FIG. 3 is a block diagram of the generalized model for the Element Inventory Schema (EIS). As discussed above, the preferred embodiment of the Object Management System 100 utilizes a model loaded within EIS 103 which includes the element type definitions as represented by Element Type 302. Each element type may represent a particular type of software construct or data structure for a code or data module existing within one of the host systems interconnected to Object Management System 100. Examples of element types include "table", "program", "database", "application", and "transaction management system". As many element types may be defined as is necessary to support a given mission of the data processing systems that are managed by Object Management System 100. Generally, a set of element types will be loaded when the Object Management System is initialized. The model is flexible, and may be updated during the life of the system using service calls to the AIM EXE 232 such as "Put Element Types" and "Import Element Types".

Each element type has predefined Binary Relationship Type 304 with one or more other element types. For example, an element type of "table" has a binary relationship type with an element of type "column". This relationship represents the fact that an element of type "table" may be created within Element Inventory 102 to represent a data module existing on one of the host systems interconnected to the Object Management System 100. The actual table may include one or more columns, and each of these columns will be represented by other elements of type "column" that are also stored in the Element Inventory 102. To restate, Element Type represents a type of a potentially reusable code or data module located on various host systems managed by Object Management System 100. The relationship types which exist between element types represent various relationship types that exist between the reusable code and data modules.

Returning to the above example, it may be said an element type of "table" has a Binary Relationship Type 304 of "includes" with an element type of "column". Looking at the relationship from another viewpoint, it may be said an element of type "column" is "included by" an element of type "table". Thus "includes" and "included by" defines the roleA and roleB associated with the relationship between table elements and column elements, as is represented by lines 306 and 308, respectively. A given element type may be associated with zero or more relationships of a particular Binary Relationship Type 304. This is indicated by vectors 310 and 312.

An Element Type 302 may each be associated with one or more attribute types such as Attribute Type 314, as is represented by Line 315. An attribute type is a type of fact that may be stored about an element. "Comment" or "data type" is an example of attribute types. More than one attribute type may be stored for a given element type.

The element type definitions are hierarchical. A given element type may include element sub-types below it in the element hierarchy, and may be included within an element super-type that is above it in the hierarchy. For example, an element type "Information System Tool" could include sub-types such as "compiler". Element super-types for "Information System Tool" could be "Tool" generally. Element types each inherits the defined attribute types associated with the super-type immediately above it in the hierarchy. This includes the ability to form the relationship types that the super-type was capable of forming. The definitional hierarchy implemented by subtypes and super-types is represented by line 316.

Multiple element types may be grouped into categories, each of which is referred to as an Element Type Group 318. This grouping is represented by line 320. In the preferred embodiment, three Element Type Groups exist: an Asset Element Type Group, a Locator Element Type Group, and a System Element Type Group. The Asset Element Type Group includes all element types that define elements that represent code, data, or system components, for example, the elements that model code, data, or system components stored on Host A 228. The Locator Element Type Group includes all element types that define elements that store the various tasks or applications that are performed by the code, data and system components represented by the Asset Elements. A detailed description of the use of the Locator Element Type Group is described below. The System Element Type Group includes all element types that define the elements that contain meta-data about the tool set of the Object Management System. For example, elements of this type will store meta-data describing the various relationships, and the locations of, the tools shown in FIG. 1 as Mission-Specific Facilities 108 and Common Facilities 110.

In the preferred embodiment, each of the definitions in FIG. 3, including Element Type 302, Binary Relationship Type 304, Attribute Type 314, and Element Type Group 318, are stored as objects within Element Repository 220. Element Repository provides a permanent, recoverable definition object stored in persistent storage (e.g., on disk) for each of these entities.

Figure 4:
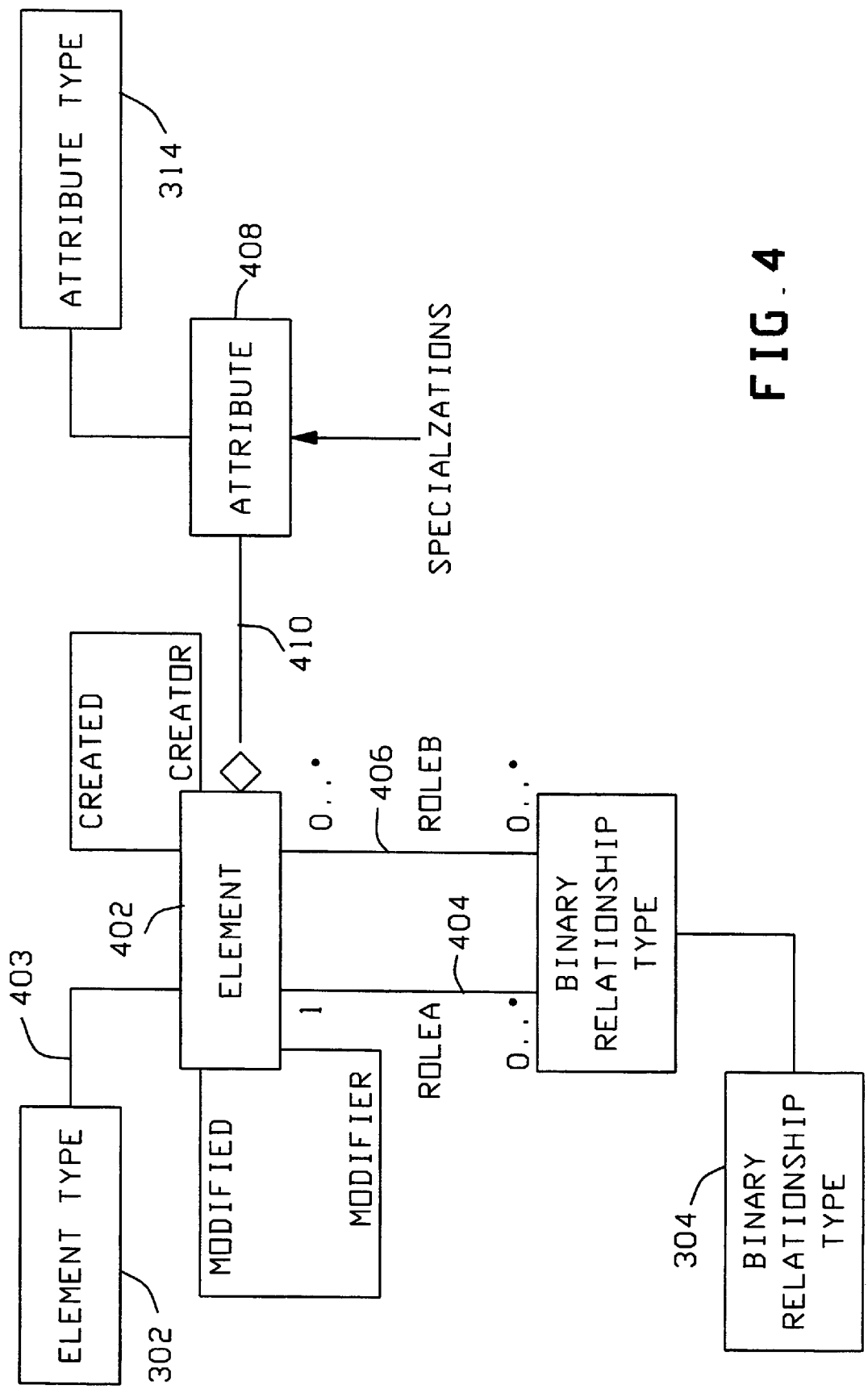
FIG. 4 is a block diagram showing the relationship between instances of elements and the various type definitions provided in the Element Inventory Schema.

FIG. 4 is a block diagram showing the relationship between instances of elements and instances of relationships, and the various type definitions provided in the model stored in the Element Inventory Schema. When an element, shown as Element 402, is created or loaded within Element Inventory 102, it is assigned to one of the predefined Element Types 302, as indicated by Line 403. Element 402 may be said to be an instance of that particular Element Type. By virtue of this association, Element 402 acquires the potential to be related to other defined element types according to each predefined Binary Relationship Type 304 that is defined for the Element Type 302, as is shown by Lines 404 and 406. Element 402 also may become associated with an Attribute 408 that is an instance of Attribute Type 314 defined for Element Type 302, as is represented by Line 410.

Element 402 and Attribute 408 are versioned objects, meaning that different versions of these elements may reside within the Element Inventory 102 at a given time. For example, if two versions of a code entity exist, two different versions of the associated element will exist. These two versions may or may not have relationships with different versions of a different element, depending on the interrelationships existing between the code entities within the system. For example, an updated version of a program will be associated with a later element version, which may or may not have the same relationships as the earlier element version. If the updated program version must reference an updated version of a table, for example, the table will further be described by meta-data in a later version of an associated element, and a relationship will be created between these two later versions of elements.

As discussed above and shown in FIG. 4, binary relationships are created between two elements. One manner of representing relationships between elements is by including pointers to the various related elements within the meta-data stored within an element. That is, the element stores a relationship indicator such as a pointer that may be used to address a respectively related element. Those skilled in the art will recognize that many ways of representing the element relationships exist, such as by storing name indicators identifying the various related elements.

Figure 5:
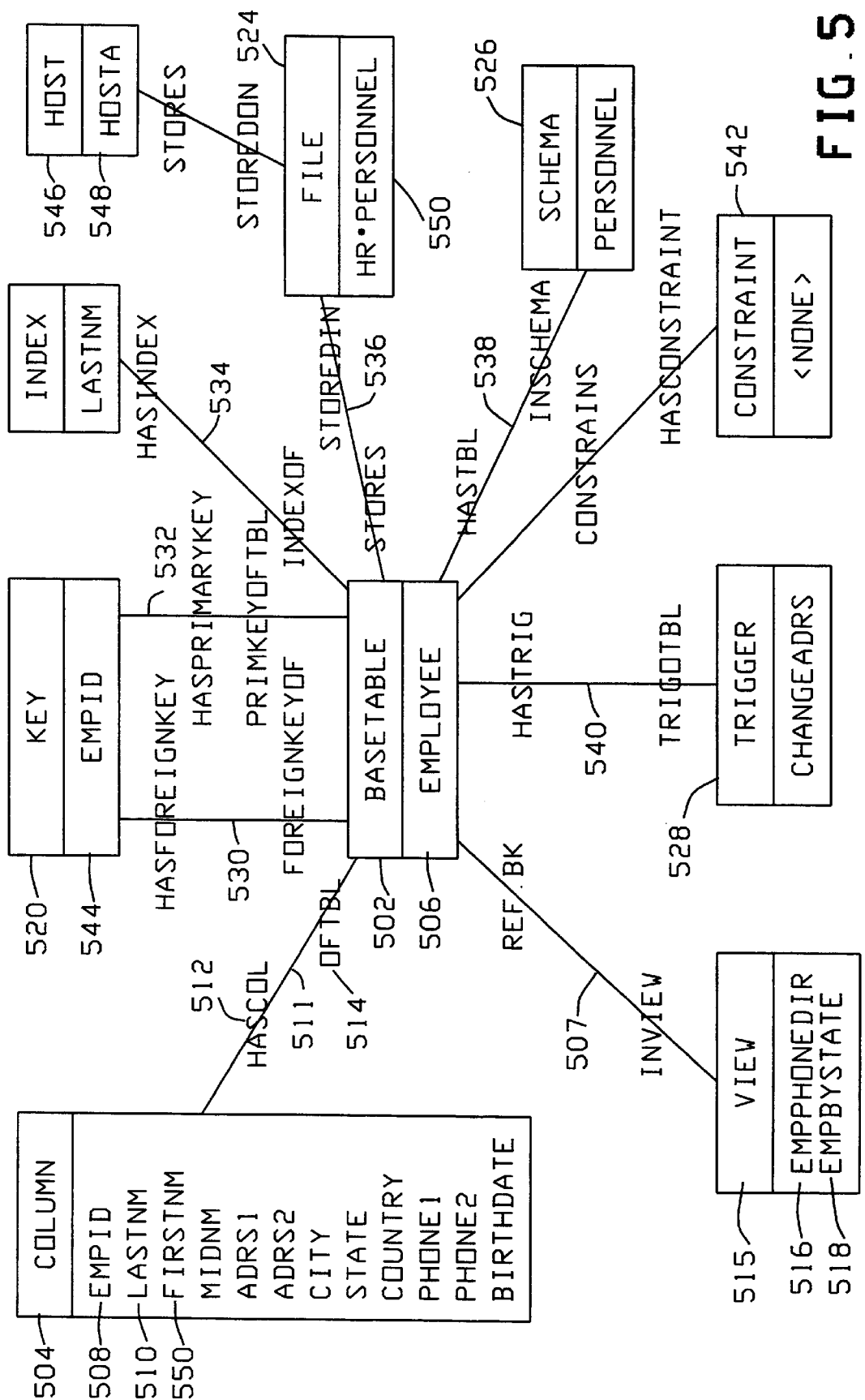
FIG. 5 is a block diagram exemplifying the use of a model to define Asset Elements.

FIG. 5 is a block diagram showing an example of using the element model to define Asset Elements. In this diagram, Asset Element types are listed at the top of each block, and the name of element instances is represented below the element type. For example, this block diagram assumes an Asset Element type of "BaseTable" 502 is defined in EIS 103. This element type has a Binary Relationship Type with the Asset Element type "Column" 504. This represents the fact that a software component which is a table (and which is represented by an element of element type "BaseTable") has (at least one) column. As stated above, the relationships between elements represent relationships between the components described by the elements.

FIG. 5 further depicts that an instance of element type "BaseTable" 502 exists called "Employee" 506. This element is a construct that stores data that describes the actual software module with which it is associated, which in this example is a table. That is, this element represents an actual table of data which exists elsewhere on the system, for example, on Host A 228. This element is assigned the element type of "BaseTable", and is also given a name representing the function provided by the table, which in this case is "Employee". The element further stores an indication of all other elements to which it is related. This actual table may include columns containing information about employees of a business. This is represented by the fact that element "Employee" is related to elements of type "Column" 504 that include elements "EmpID" 508, "LastNm" 510, and the like. These column elements are related to element "Table" through the Binary Relationship Type represent by Line 511, and described by roleA 404 and roleB 406 of "hasCol" 512 and "offTbl" 514. This represents the relationship between the actual table component, and the individual column components that comprise the table. Hereinafter, for the sake of brevity, instances of binary relationships will be discussed and depicted in terms of either roleA 404 or roleB 406, but not both.

Element type "BaseTable" is shown having various other predefined relationships to other element types include element type "View" 515. Two instances of element type "View" 515 shown as "EmPhoneDir" 516 and "EmpByState" 518 are shown to exist, each having a relationship with element "Employee" 506 represented by Line 507. Other element types related to element type "BaseTable" include "Key" 520, "Index" 522, "File" 524, "Schema" 526, and "Trigger" 528, all of which have Element instances created and stored in the Element Inventory 102 which are related to element Employee 506, as is represented by Lines 530 and 532, 534, 536, 538, and 540, respectively. It may be noted that element type "Constraint" 542 is related to element type "BaseTable". However, for the particular element instance "Employee" of element type "BaseTable", no element instance of type "Constraint" 542 has been created. This demonstrates that the element and relationship type definitions within EIS 103 define potential, not mandatory, relationships which may or may not be established for a given element instance. It may further be noted that more than one type of relationship can be established between an element of a given element type and another element of a second element type. For example, element "Employee" 506 of element type "BaseTable" 502 is capable of establishing the two different types of relationships represented by Lines 530 and 532 with element "EmpID" 544 of element type "Key" 520.

Attributes 408 of a predetermined Attribute Type 314 may be attached to each of the Elements. For example, assume the element type "Column" is related to an attribute type of "DataType" describing the data type of the column data. For a created element instance of element type "Column", meta-data may be stored within the element to describe the data stored within the associated data module containing the column data, and may indicate that data is of type string, long integer, short integer, or character, for example.

For any of the Asset Elements, information is also stored that describes the location of the associated code, data or system component. This information does not necessarily have to be stored within each of the elements, but need only be stored within one of the elements within a group of elements. This can best be understood by returning to the current example. As noted above, it will be assumed element "Employee" 506 represents, and contains meta-data associated with, an actual table existing on one of the servers or host systems associated with the Object Management System 100. Assume this table resides on Host A 228 of FIG. 2. Somehow the location of this table must be recorded within the Element Inventory. This can be done by recording the information directly in each element associated with the table. For example, the server name, directory path, and any other location information could be recorded within element "Employee" 506, and further within all other elements describing the table data, including each and every Column Element shown in FIG. 5. This approach results in duplication of a large amount of data, since multiple elements store the same location information. This data duplication means that more space is required to implement Element Inventory 102, and also means that a change in location of a given code or data module requires changes to many elements.

Instead of storing location information in every element, in the preferred embodiment, the location of the table is only recorded once. This location is stored in a separate element having a dedicated element type. In the current example, this element type is called "Host" 546. An instance of this element type called "Host A" 548 is shown connected to element "HR*PERSONNEL" 550 via a relationship represented by Line 552. Element "Host A" 548 will include the server name and directory path for the file "HR*PERSONNEL" located on Host A 228. Further assume that the relationship represented by Line 536 indicates that the file "HR*PERSONNEL" stores a table represented by element "Employee" 506. Because the location of the file is known, by implication the location of the included table is also known, and can be determined by traversing element relationships stored within Element Inventory 102 to find the element of type "Host" 546.

The example of FIG. 5 helps illustrate the modeling approach. A model is stored within the EIS 103 describing potential relationships and attributes for a defined element type. For each element type, element instances may be created having only some, or all, of the predefined relationships. An element instance may have a selectable multiple number of relationships of a given type. For example, BaseTable "Employee" 506 has multiple relationships of the type "hasCol", each with an instance of element type "Column" 504.

At this point, it will be recognized by one skilled in the art that an object management system for managing code and data components could be constructed without the use of a model to define the various elements. For example, the definition of each of the element structures could be stored within the associated element itself without having a separate element definition provided by the model. However, the use of a model makes many of the tasks associated with managing objects easier. For example, often it is desirable to locate all elements that are somehow related to a particular target element of interest. As discussed above, this could be necessary if an entire application is to be ported to a new environment. To facilitate this task, every relationship associated with the target element must somehow be recorded so that it may be traversed. If the definitions for these relationships are recorded within the element themselves instead of within a model, the various tools used to search, manage, create, and modify elements must include hard-coded information about each Element Type. If a model is used, however, these element management routines may use the model as a map to traverse the relationships within the Element Inventory 102, and to further create and/or modify elements, and no special knowledge about element type definitions need be incorporated within the actual management tools.

The use of the model in searching the Element Inventory 102 is best shown by example. Assume the model for element type "BaseTable" is stored in the Element Inventory Schema 103. A particular named element within the Element Inventory may be known or is otherwise located. The associated element type for the known element is used to access the element type definition within the model. The model indicates that the subject element type is associated with one or more Binary Relationship Types. For each of these Binary Relationships Types, the meta-data stored within the element is analyzed to determine if any instance of these Binary Relationship Types exists for the particular element instance. If an instance of any of these Binary Relationship Types exists for the element instance, the Binary Relationship instance may be traversed to locate a related element. This process can be made recursive such that each of the identified elements is made the target of the search, and all related elements associated with the target are further identified. Using this method, the element relationships can be traversed to find all elements that are either directly, or indirectly, related to the target element. All relationship traversal is performed using the model definition. This model-based method is particularly useful because it can accommodate the situation wherein new element type definitions are added to the Element Inventory Schema 103, or wherein element type definitions are modified. This modification of element definitions can be accomplished without modifying any of the element management tools.

As mentioned above, searching of the Element Inventory may be performed to identify related elements for the purpose of migrating the associated code and data components to a new platform. However, other uses exist for traversing relationships. For example, before a code entity is modified, it may be desirable to assess the possible impact the changes will have on other code or data entities. This impact analysis can utilize the model stored in the EIS to traverse element relationships so that code and/or data components related to the component that will change may be located and evaluated. Further modifications may then be made to related components, if necessary, so that compatibility is maintained. This type of analysis can also be made when a component is deleted.

The element and element relationship types discussed above and shown in FIG. 5 may be described as element types and element relationships existing within the "Technology" Domain. This Technology Domain mapping represents how the associated data structures and software concepts interrelate. For example, an element of type "Program" relates to an element of type "Subroutine" via a relationship of type "calls", an element of type "Subroutine" relates to an element of type "Database" via a relationship of type "accesses", and etc. As discussed above, these mappings can be used to identify a group of elements that operate together as a unit. The Technology Domain mapping does not, however, provide information on the type of application(s) with which the particular element is associated. That is, the Technology Domain mapping does not indicate the type of problem the associated code or data component is designed to solve. For example, the Technology Domain mapping does not indicate whether the associated software construct is designed to solve a banking problem, book an airlines reservation, or perform a calculation related to an insurance application. This type of application-related information is generally provided in a separate index that may be referred to as an Application Domain mapping. This Application Domain mapping can be used for many purposes, including determining which elements are available for potential reusability when developing related applications.

In prior art systems, any Application Domain mapping is independent of the Technology Domain mapping. Thus, once an element is identified using an Application Domain mapping, any related elements must be discovered using the separate Technology Domain mapping. This is both time-consuming, and also makes it difficult to automate the process of identifying related elements. The current invention integrates the domain mappings to provide an efficient way to identify code and data components using a Natural Language Understanding (NLU) search.

Definition of the Application Domain

Figure 6:
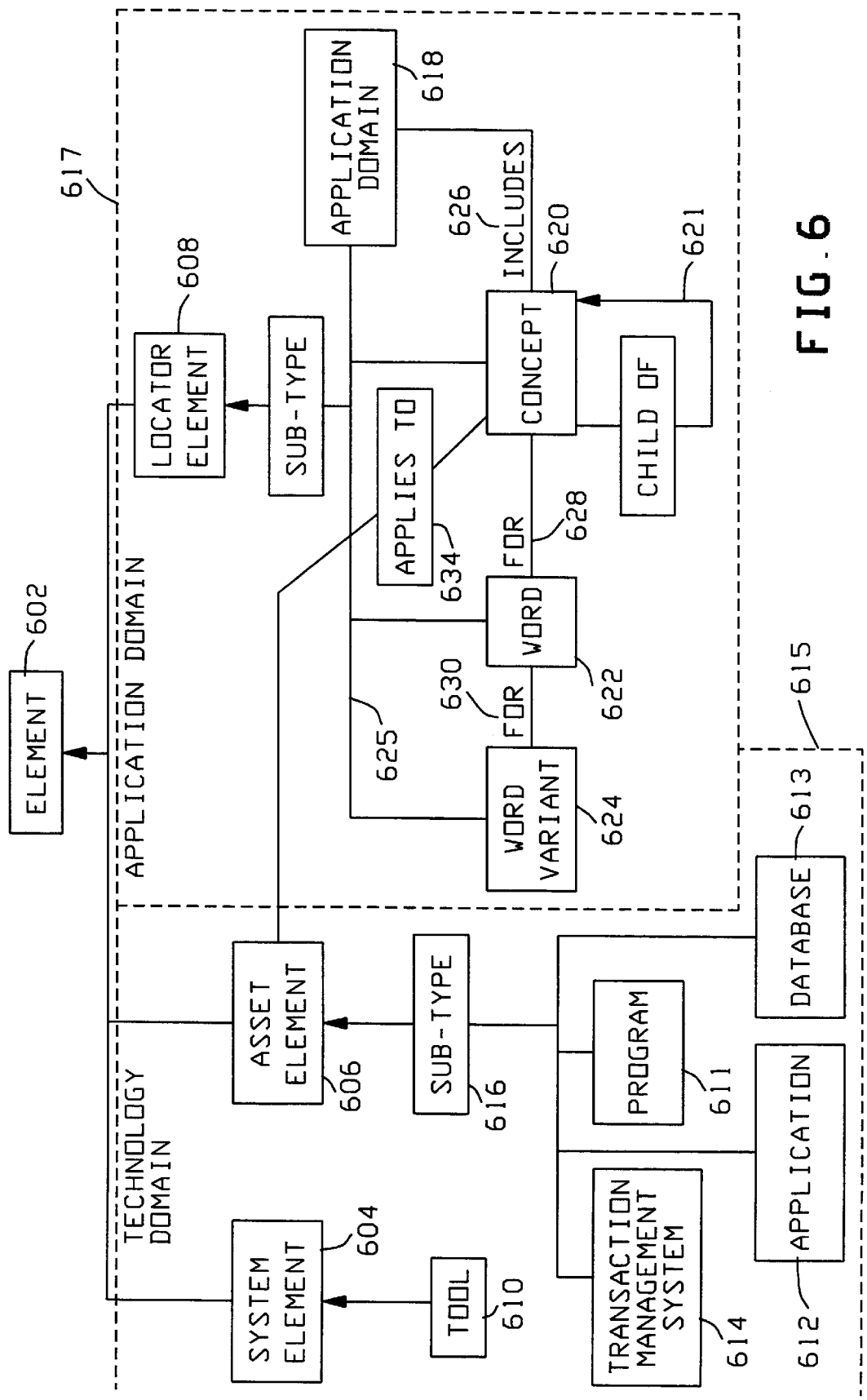
FIG. 6 is a block diagram of the model stored in the Element Inventory Scheme (EIS).

FIG. 6 is a block diagram of the model stored in the EIS 103. As discussed above, this model is hierarchical. In the preferred embodiment, the root Element Type is designated "Element" 602. Under the root element type "Element" are three subtypes called "System Element" 604, "Asset Element" 606, and "Locator Element" 608. These are referred to as "sub-types" because these element types have a subtype relationship with element type "Element". This subtype relationship is shown as Line 316 of FIG. 3. This subtype relationship allows each of the element subtypes to inherit certain characteristics of the element type "Element".

Element type "System Element", and all element types which are a subtype of type "System", are used to define elements that support the operations of the Object Management System. For example, "System Element" 604 has an element subtype of Tool. 610, wherein an instance of type Tool includes meta-data about the various tools used in the object management system.

Element type "Asset Element" includes those element subtypes that are used to support the Information Technology (IT) Mission of the system. As discussed above in reference to FIG. 5, these element subtypes may include the element types of "Program" 611, "Application" 612, "Database" 613, "Transaction Management System" 614, and so on, that are used to accomplish the particular tasks of the user. Many different Asset Element types may be created depending on the needs of the user. For a given Object Management System, literally thousands of different Asset Element types may be defined within the EIS 103. Both System and Asset Element types are defined in the manner which is exemplified in FIG. 5 and discussed above in reference to Technology Domain mappings, as is indicated by Box 615 (shown dashed). These element types may include sub-types that include subtypes, and etc., in a hierarchical manner as represented by FIG. 3. The "subtype" relationship represented by Line 616 between the element type "Asset Element" 606 and the other subtypes allows each of the element subtypes to inherit certain characteristics of the element type "Asset Element". For example, all element types that are a subtype of element type "Asset Element" 606 are capable of forming the same type of relationships that may be formed by an element of type "Asset Element". This will be explained further below.

Application Domain mapping is performed using the Element type "Locator Element" 608 and all element types which are a subtype of element type "Locator Element" 608, as is indicated by Box 617 (shown dashed). As with the Technology Domain mapping, the Application Domain mapping follows the model shown in FIG. 3 which allows for hierarchical definitions. Within the defined hierarchy, element type "Locator Element" has several sub-types, including element types "Application Domain" 618, "Concept" 620, "Word" 622, and "Word Variant 624". By virtue of the subtype relationship represented by Line 625, each of these subtypes inherit the characteristics of element type "Locator Element" 608. This includes the ability to form relationships of the type that can be formed by element type "Locator Element".

The four element types that have relationships of type "subtype" with element type "Locator Element" also have various relationships with one another. Element type "Application Domain" 618 has a relationship type of "includes" 626 with element type "Concept" 620, as is shown by Line 626. Element type of "Concept" 620 has a relationship type of "for" with element type of "Word" 622, as is represented by Line 628. Element type of "Word" 622 has a relationship of type "of" 630 with element type of "Word Variant" 624, as indicated by Line 630. Finally, the element type "Concept" 620 may be related to itself via a binary relationship of type "child of" as indicated by Line 621.

The element types that have a subtype relationship with element type "Locator Element" 608 shown in FIG. 6 are used to create a hierarchical tree structure of natural language concepts. An element of type "Application Domain" 618 is used to store an indicator of a particular broad application area. Elements of type "Concept" are used to define concepts that have a subset relationship to a related element of element type "Application Domain". The concept hierarchy is further extended by defining other elements of type "Concept" that have a relationship of type "child of" 621 to a previously-defined Concept Element. This newly-defined Concept Element may be described as a "child" of the originally-defined "parent" concept. The child Concept Element will store a concept that is a sub-category of that stored by the parent Concept Element to which it is related. Any number of hierarchical levels of Concept Elements may be created, and any Concept Element may have one or more children. Children of the same parent concept are said to be "sibling" Concept Elements.

Each Concept Element, regardless of the level at which it exists within the Concept hierarchy, may have a relationship of type "for" 628 with an element of type "Word". An element of type "Word" stores a word that is somehow indicative of a concept stored by a directly-related Concept Element. An element of type "Word" 622 can be related to multiple elements of type "Concept" 620.

Finally, an element type "Word Variant" 624 stores a derivative form of a word stored by a directly-related Word element. This derivative form may be a plural, possessive, acronym, abbreviation, slang term, foreign language representation, or any other alternative form required or desired by a user. In the preferred embodiment, a Word or Word Variant element stores a character string, but other representations for a word could be utilized.

FIG. 6 further shows that element type "Concept" can form a relationship of type "applies to" 634 with element type "Asset Element" 606. Because of the principle of inheritance described above, any element type that is a subtype of element type "Asset Element" can also form a relationship of "applied to" 634 with a element type "Concept". This type of relationship maps a natural language concept residing within Application Domain 617 to an element that resides with the Technology Domain 615. The creation and use of the element and relationship types shown in FIG. 6 are best explained in the following examples.

Figure 7:
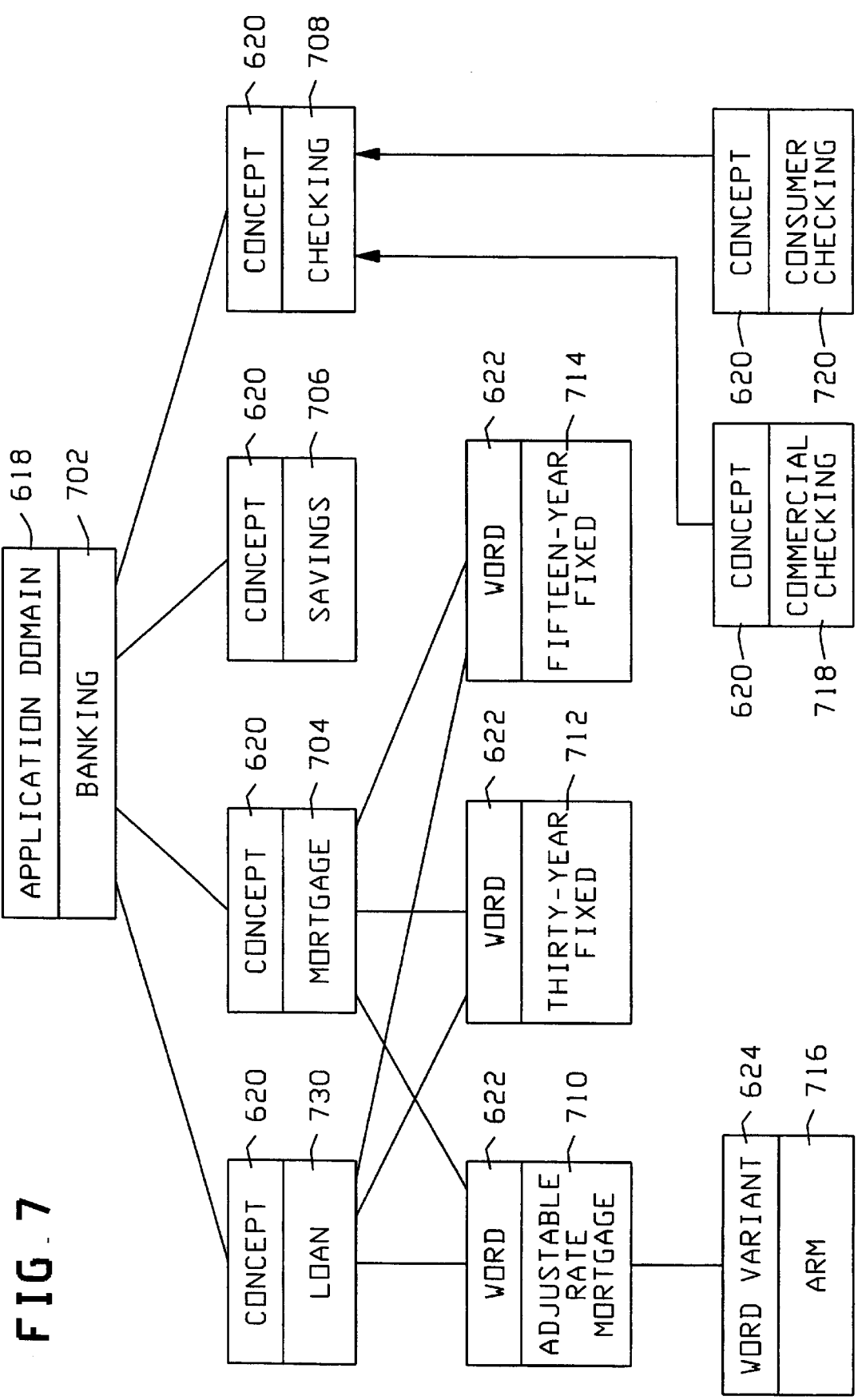
FIG. 7 is a block diagram illustrating the interrelationships between element instances created using the element subtypes of element type "Locator"

FIG. 7 is a block diagram illustrating the interrelationships between element instances created using the element subtypes of element type "Locator". This diagram is similar to that shown in FIG. 5. Within each block, element types are listed across the top, with the instance of the element appearing below. An element of type "Application Domain" 618 is created to store the broad concept identifier "Banking", shown as element 702. Elements of element type "Concept" 620 may be created for the element "Banking" which include elements "Loan" 730, "Mortgage" 704, "Saving" 706, and "Checking" 708. These elements are associated with concepts that identify areas within the broad category "Banking". Further assume elements of type "Word" 622 are created having a relationship with element "Mortgage" 704 to describe various types of Mortgages. These elements could include such elements as "Adjustable Rate Mortgage" 710, "Thirty-Year Fixed" 712, or "Fifteen-Year Fixed" 714. In a similar manner, elements of sub-type Word 622 could be created for each of the elements of sub-type Concept. Further assume an element of sub-type "Word Variant" 624 is created having a relationship to element "Adjustable Rate Mortgage" 710 that stores the acronym "ARM", shown as element 716. Other similar elements of sub-type Word Variant could be created to store acronyms, synonyms, abbreviations, or foreign language representations having relationships to other elements of type "Word" 622. In addition, each of the Word and Word Variant elements can be associated with multiple Concept Elements. This is shown by Concept Element "Loan" 730, which is associated with Word Elements "Adjustable Rate Mortgage" 710, "Thirty-Year Fixed" 712, and "Fifteen-Year Fixed" 714. The resulting relationships form a hierarchical tree structure that branches from the element "Banking" 702 and describes various application-type concepts that are each somehow related to the broad term "Banking" and which may be used to describe various ones of the Asset Elements.

Taken together, all of the elements of type "Word" 622 and "Word Variant" 624 are described as the "Lexicon" of the Object Management System. The use of this Lexicon in performing a search of Element Inventory 102 will be discussed further below.

FIG. 7 further shows the use of the parent/child relationships as shown in FIG. 6 in defining elements of type "Concept" 620. Concept Elements called "Commercial Checking" 718 and "Consumer Checking" 720 might be described as children of parent concept "Checking" because these elements have the parent/child relationship with element Checking as represented by Line 621 of FIG. 6. These child concepts are further said to be siblings to each other. These child elements store concepts which may be described as sub-concepts of the concept represented by element "Checking" 708. As discussed above, each of the child concepts may have a relationship as a parent to a different concept element, so that many levels of hierarchy may be created within the concept elements. Each of the Concept Elements may be associated with Word elements in a manner which is similar to that shown for elements "Loan" 730, "Mortgage" 704, or "Savings" 706.

Integrating the Application Domain Knowledge with the Technology Domain Knowledge As discussed above, element type "Concept" has a predefined relationship type with element type "Asset Element" referred to as "applies to", shown in FIG. 6 as relationship type "applies to" 634. This relationship type is used to map Application Domain knowledge to Technology Domain knowledge. It may be recalled that for the subtype/supertype relationship, each of the element types that are children of a parent element type inherits the ability to form the relationship types the parent element types have the capability to form. Therefore, any of the element types that are defined as a subtype of type "Asset Element" 606 inherits the potential to form one or more relationships having the relationship type "applies to" 634 with a element of type "Concept" 620 or "Child Concept" 632. Application to Technology Domain mapping is accomplished by creating a specific instance of relationship type "applies to" between a specific element of type "Concept" 620 and a specific Asset Element.

FIGS. 8A and 8B, when arranged as shown in FIG. 8, is a block diagram showing an example of Application Domain mapping to Technology Domain mapping using the elements shown in FIG. 7. As discussed above, the elements from FIG. 7 perform an Application Domain mapping function. FIG. 8 further includes Asset Elements, which are illustrated as blocks with the element type listed across the top, and the element instance listed below. Element "BankStatements" 802 is an element of type "Application" 612, which is an element type defined as an aggregation of programs. Thus, this element has a defined relationship of "Aggregation" 806 with element "CheckStatements" 810, of element type "Program" 611, and has the defined relationship of "Aggregation" 812 with element "LoanStatements" 816, which is also of element type "Program" 611. The two elements CheckStatements 810 and LoanStatements 816 might be programs that are executed to generate the monthly bank statements for banking clients. Each of these two programs is shown having a relationship of type "References" 822 with the element "ClientData" 820, which is of element type "DataBase" 613. During execution, program CheckStatements 810 calls a subroutine called "PrintCheckStatements". This relationship is illustrated as relationship "Calledby" 826 between element CheckStatements 810 and element PrintCheckStatements 828, which has an element type of SubRoutine 830.

The asset elements shown in FIG. 8 represent a Technology Domain Mapping that illustrates the manner in which various software constructs interrelate within the Application "BankStatements". If an operation such as a transformation or renovation function is performed on this application, all of the asset elements shown in FIG. 8 must be considered as targets of that operation. Because of the element relationships existing between these Asset Elements, the code, data, and system components represented by the elements may be identified so that a group operation may be performed. One way to identify the interrelated entities is by using Element Viewers 144 to graphically view the specific element "BankStatements" and all elements having a relationship to these elements. However, if the user is not aware of a specific named element, it is desirable to locate related elements by specifying concepts from the Application Domain so that these concepts may then be used to locate Asset Elements within the Technology Domain. Mapping from the Application to Technology Domain is performing using the predefined relationship type "applies to" 634, as described above, which is shown in FIG. 6 existing between element type "Concept" 620 and "Asset Element" 606.

FIG. 8 illustrates an instance of relationship type "applies to" existing between concept element "Mortgage" 704 and program element "LoanStatements" 812, as shown by Line 840. Similarly, the relationship illustrated by Line 841 interconnects concept element "Loan" 730 with program element "LoanStatements" 816, and the relationship illustrated by Line 842 interconnects concept element "Checking" 708 with program element "CheckStatements" 810. These relationships can be handled in the same manner that any other predefined relationships are used to enable the efficient location of elements that are specified according to natural language concepts. This can best be understood by example.

Assume a user who is unfamiliar with a particular data processing system and its associated software applications wants to determine which software code and data constructs are available for processing Adjustable Rate Mortgage information. The user can provide the term "ARM" as a natural language expression to Element Locator 124. The Element Locator will first search all elements of type "Word" 622 and "Word Variant" 624 for a match of the ASCII character string "ARM". If an element is found which stores this string, relationships are traversed to obtain the related concept. In this example, element 716 is initially located. By traversing relationship 850, Word element "Adjustable Rate Mortgage" 710 is located. Element Locator next traverses all relationships of type "for" 628 (shown in FIG. 6) to find concepts "Loan" 730 and "Mortgage" 704. According to one embodiment of the invention, Element Locator may next determine if the located elements "Loan" and/or "Mortgage" have parents or children existing within the Concept/Subconcept element hierarchy discussed above. If so, and if the search parameters have specified that this hierarchy is to be included in the search, the Element Locator may further traverse up and/or down the Concept/Subconcept hierarchy a predetermined number of levels as specified by the user, so that the located concepts are further included in the list of located Concept Elements. Finally, using the identified Concept Elements, the various "AppliedTo" relationships are traversed to find all related Asset Elements. In this example, Element Locator has identified Concept Elements "Loan" 730 and "Mortgage" 704, and thereafter traverses relationships shown by Lines 841 and 840, respectively, to locate Asset Elements "LoanStatements" 816.

In the preferred embodiment, once the initial list of Asset Elements is identified, traversal of Asset Element relationships starting with these identified elements may be performed manually using Element Viewers 144, or may be automatically accomplished using the Affinity Analyzer 122. This will be discussed further below. Since the same type relationship traversal may be performed for Locator Elements and Asset Elements, in an alternative embodiment, the Element Locator 124 could be adapted to continue the element traversal to locate all other Asset Elements having relationships with the initially-located Asset Elements. However, relationship traversal is not generally continued in an automated manner once an initial set of asset elements is located for practical reasons that will be discussed further below. Since the traversal of element relationships is performed using the definition of the element types in the model, the algorithm used to perform this traversal is independent of the specific element types or interconnecting relationship types that may be defined for the given instance of the Object Management System.

Figure 9A:
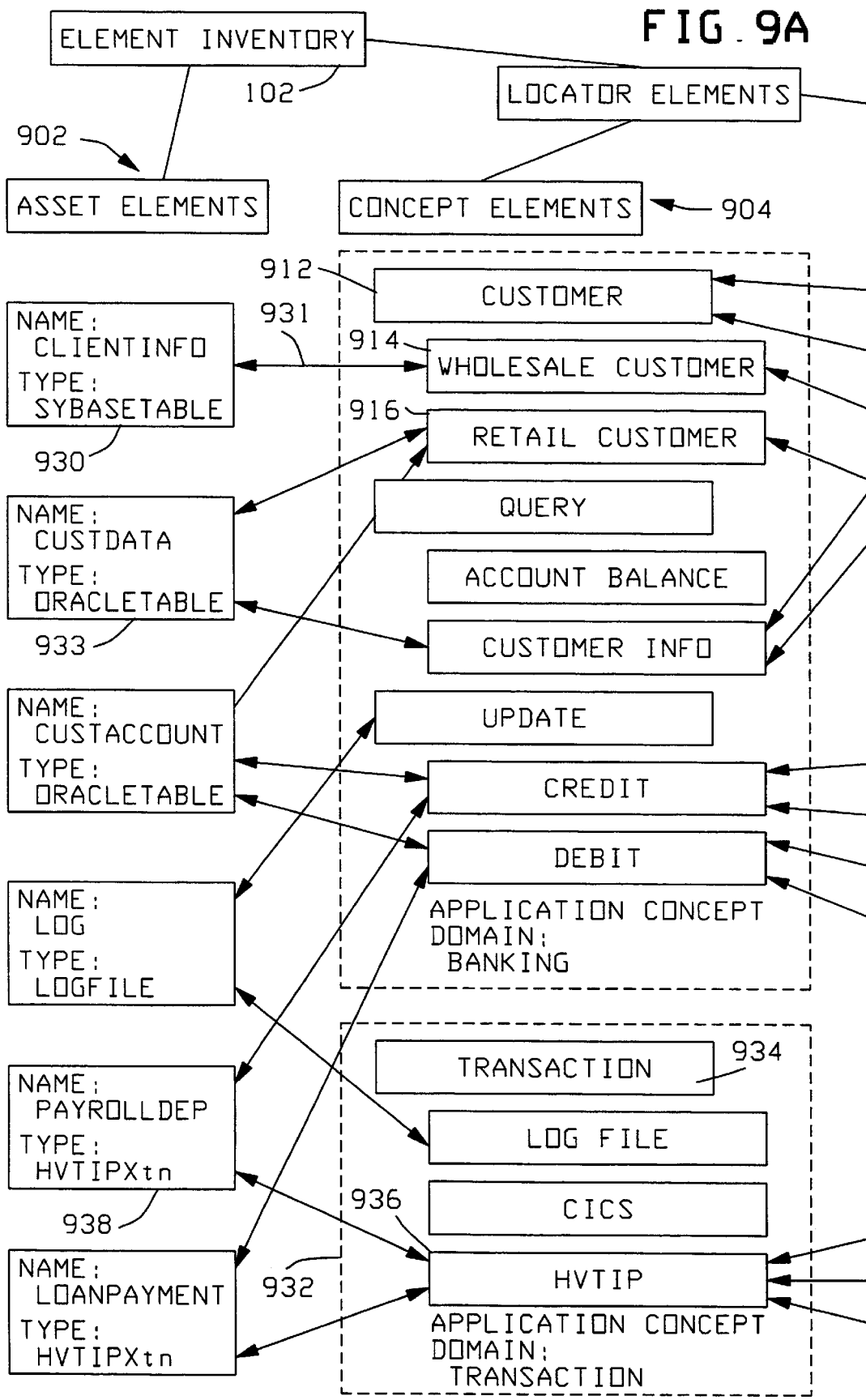
FIG. 9 is a diagram showing a second example of Application Domain to Technology Domain mapping.

FIG. 9 is a graph showing a more detailed example of Application Domain to Technology Domain mapping. Each of the blocks in FIG. 9 represents an element or a collection of elements in Element Inventory 102. Elements of the type "Asset Element" 606 are shown in column 902. Each of these Asset Elements may be said to map into the Technology Domain as software constructs of a particular type. Elements of the type "Locator" 608 are shown as Concept Elements 620 in Column 904, with each sub-concept element being listed indented below the parent Concept Element to which the sub-concept relates. Word Elements are listed in Column 906, and Word Variant Elements 624 are listed in Column 908. As discussed above, the collection of Word and Word Variant elements comprise what is referred to as the "Lexicon" 910 of the Object Management System.

In the example of FIG. 9, the Concept Element "Customer" 912 is shown as being related to two Concept Elements "Wholesale Customer" 914 and "Retail Customer" 916 via a sub-concept relationship. That is, both of the elements "Wholesale Customer" 914 and "Retail Customer" 916 may be said to be "child" concepts of concept "Customer" 912, and may also be described as children of the parent element "Customer". This concept/subconcept hierarchy may be any number of levels deep depending on user requirements.

Concept Element "Customer" 912 has a relationship of type "for" 628 with Word Element "Client" 918 shown by Line 919. Word Element "Client" has a relationship "of" 624 with a collection of Word Variant Elements "Clients" 920, "Client's" 922, "Clients" 924, and "ClientData" 926 as is represented by Line 928.

The Application Domain mapping is performed by creating a relationship of type "AppliedTo" 634 from various Concept Elements, such as "Wholesale Customer" to Asset Elements such as "ClientInfo" 930, as represented by Line 931, or from "Retail Customer" 916 to "CustData" 933. The resulting relationships can be automatically traversed using Element Locator 124 so that a user can identify an Asset Element or a related collection of Asset Elements merely by providing a natural language word description of the desired concept.

FIG. 9 further shows a further embodiment of the invention, wherein Lexicon 910 is expanded to include another Application Concept Domain shown by Block 932, which represents Concept Elements such as "Transaction" 934 and "HVTIP" 936. This particular Application Concept Domain includes concepts and words that actually describe certain ones of the Asset Element types. In that respect, this Application Domain might be said to include concepts and words that are descriptive of the Technology Domain. For example, Asset Element 938, called "PayrollDep", contains meta-data describing a code component that is part of a HVTIP Transaction for performing a Payroll Deposit transaction. This is indicated by the element type for this element, which is "HVTIPXtn". This element type describes a particular type of software construct, and might therefore be said to reside within the "Technology Domain" as discussed above. One of the Concept Elements "HVTIP" 932 shown in Block 932 resides in the Application Domain, but stores the concept "HVTIP" that is descriptive of the software construct type "HBTIPXtn".

It will be recalled that relationships of the type described in the foregoing paragraph already exist between each Asset Element stored in Element Inventory 102 and an associated element type stored in the EIS 103. These relationships may be used by the Element Explorer View of Element Viewers 144 to inform a user of the elements/element type matchings. (It might be remembered that in this view, a user may specify a particular element type as defined within the EIS 103, and in response, Element Explorer View will provide a list of all of the elements stored within the Element Inventory 102 that are of the type specified.) Since an element/element type matching function is already provided to the user, the creation of Concept Elements indicative of element types might, at first glance, appear redundant. However, these Concept Elements can be matched with Word and Word Variant elements in a manner that is not supported by the EIS. This capability would allow a user to search, for example, on the natural language phrase "TIP Transaction" as shown stored in Word Element 940. Depending on the tasks to be performed by the Object Management System, this migration of some of the technology domain concepts into the Application Domain may be a useful function.

Figure 10:
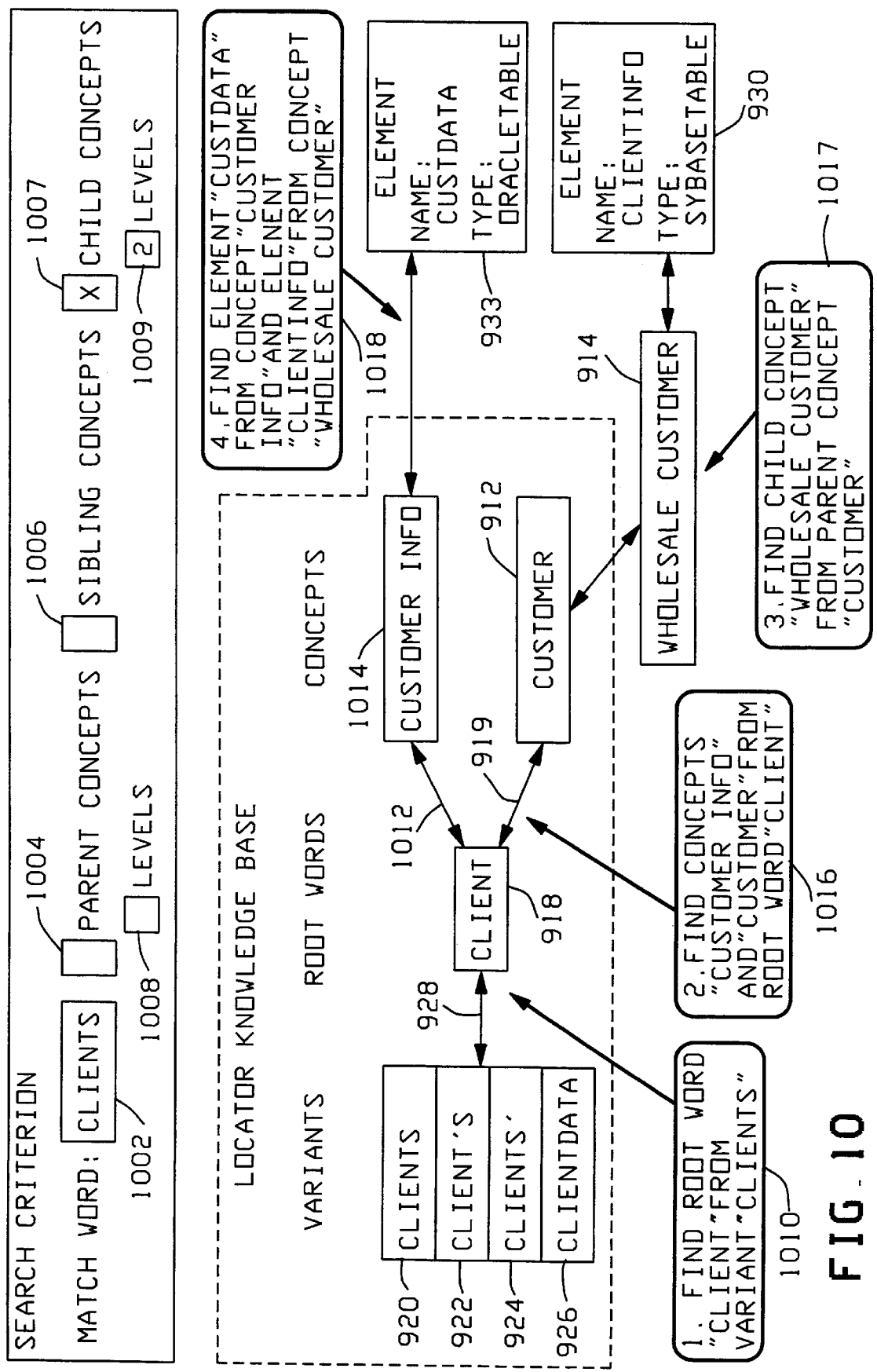
FIG. 10 is a diagram showing an example of using the Element Locator to search the Lexicon of FIG. 9.

FIG. 10 is a graph showing an example of using the Element Locator 124 to search the Lexicon 910 of FIG. 9. According to one embodiment of the invention, Element Locator 124 allows the user to specify a match phrase as shown specified in box 1002. This is the phrase used to search Lexicon 910 to locate Word and Word Variant Elements. The user is further allowed to specify, for any Concept Elements located during the search, whether Concept Elements which are parents, sibling, and/or children will also be included in the search. This selection capability is shown provided by Boxes 1004, 1006, and 1007, respectively. As discussed above, the concept hierarchy can extend many levels. Therefor, according to one embodiment of the invention, the user is allowed to individually select the number of levels of hierarchy included in the concept traversal for the parent concepts, as well as the number of levels to traverse for the children concepts. This is shown by Boxes 1008 and 1009, respectively.

In the example of FIG. 10, a user specifies "Clients" in Box 1002 as the search phrase. Element Locator 124 searches Lexicon 910, including all Word and Word Variant elements to locate the Word Variant Element 920 storing "Clients" as is shown by step 1 in Box 1010. Element Locator then traverses relationship shown as Line 928 to Word Element "Client" 918, and further traverses relationships shown as Lines 919 and 1012 to Concept Elements "Customer" 912 and "Customer Info" 1014, respectively, as shown in step 2 listed in Box 1016. Since the user selected "Child Concepts" in Box 1007, all children of Concept Element "Customer" 912 and "Customer Info" 1014 are added to the search, as shown in step 3 listed in Box 1017. This includes Concept Element "Wholesale Customer" 914. Since "two" levels of hierarchy are selected for use in the child search in Box 1009, any children concepts of "Wholesale Customer" 914 (not shown in FIG. 10) would also be included in this search. After these Concept Elements are identified, the relationships of type "AppliedTo" 634 are traversed to find the Asset Elements shown as elements "CustData" 933 and "ClientInfo" 930. This is shown in Box 1018 as step four. After the Asset Elements related to the desired concepts have been identified, other tools are available within Object Management System 100 to further traverse the relationships among Asset Elements to find the related Asset Elements. This will be discussed further below.

In the preferred embodiment of the invention, the user interface to Element Locator 124 queries the user as each new level of Concept Elements are located, providing an opportunity for the user to remove undesired concepts from the list before continuing with the search. For example, after step two in Box 1016, Element Locator 124 interactively provides a user with a list of Concept Elements "Customer Info" 1014 and "Customer" 912. The user may decide to remove "Customer" 912 from this list. This would further prevent location of the concept element "Wholesale Customer" 914. According to the preferred embodiment, this opportunity for user intervention is provided as each level of the Concept hierarchy is traversed, assuming multiple levels of hierarchy exist.

Figure 11B:
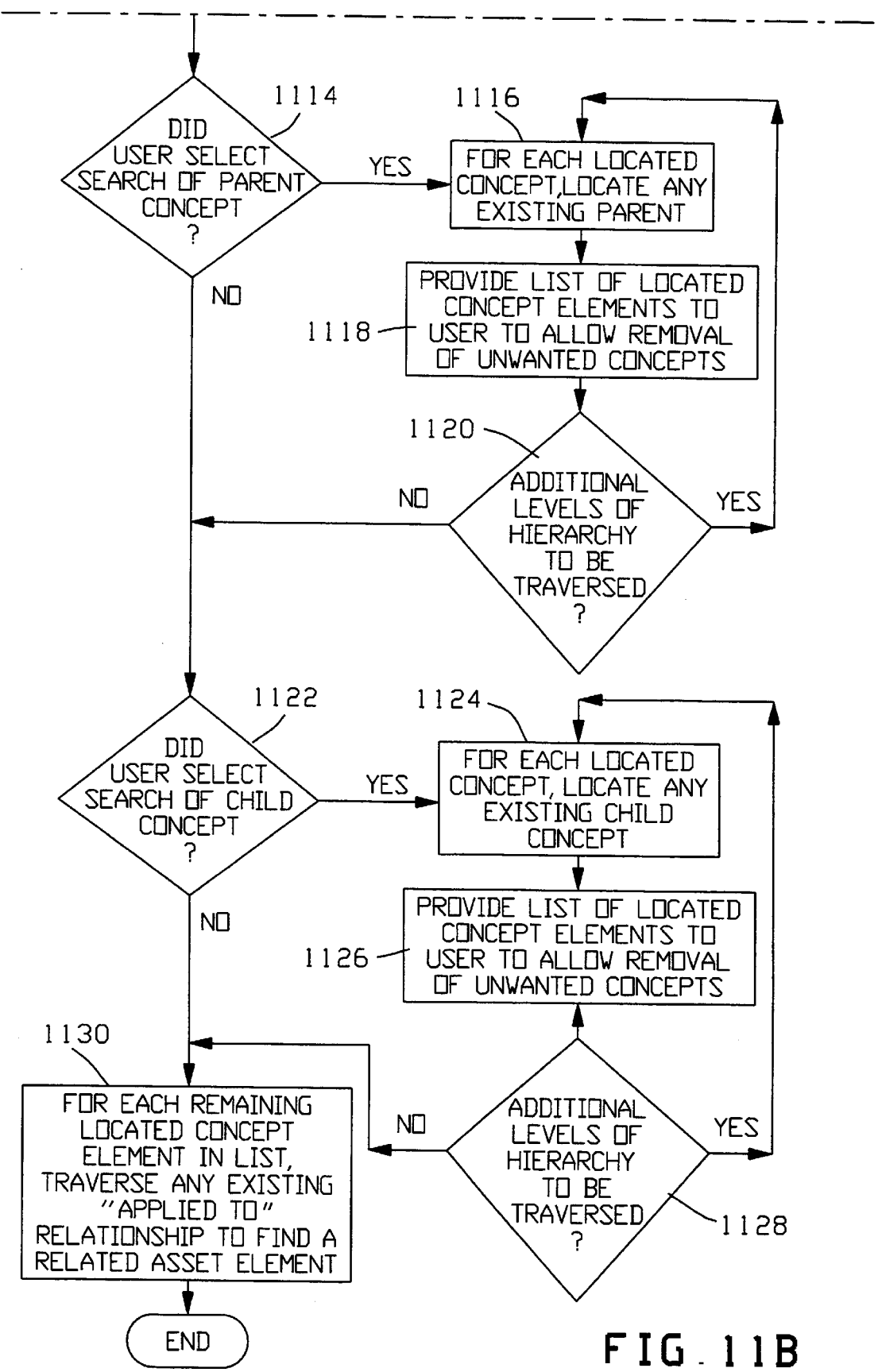

FIGS. 11A and 11B, when arranged as shown in FIG. 11, are a flow chart of the process used by the Element Locator 124 to traverse the element constructs during a search of the type illustrated in the example of FIG. 10. The Element Locator receives user input, which in the preferred embodiment is a character string, and some search selection parameters of the type shown in FIG. 10. This is shown in Step 1102. The Word and Word Variant Elements are searched to find any existing match to the provided character string, as shown in Step 1104. If a match is found within a Word Variant Element, the specific relationship of type "Of" 630 is traversed to find the related Word Element(s), as shown in Step 1106. The identified Word Element(s), which may have been identified by either one of Steps 1104 or 1106, are then provided to the user to allow the user to remove any unwanted words from the list. This is shown in Step 1107. This step is allowed since a string stored in a Word Variant Element may be a variant of more than one Word Element.

After the user has removed any unwanted words from the list, each of the remaining Word Elements are processed to find the related Concept Elements, as shown in Step 1108. This is done by traversing the relationships of type "For" 628. The initial list of Concept Elements is then provided to the user to allow the user to interactively select ones of these elements to be removed for further consideration in the search, as shown in Step 1110. If the user selected the addition of Sibling Concept Elements, the Concept Element hierarchy is traversed to find any Sibling Concept Elements that may exist for each of the remaining Concept Elements in the list. This is shown by Decision Step 1111, and Step 1112. If the user further opted for the inclusion of Parent Concept Elements within the List, each of the Concept Elements in the list obtained in Step 1110 is processed to determine whether a Parent Concept Element exists. This is shown by Decision Step 1114 and Step 1116. The located Parent Concept Elements are added to the list. The user is then allowed to remove any identified elements from the list before continuing with the search, as shown in Step 1118. This process is repeated for each additional level of hierarchy to be included in the search, as is shown by Decision Step 1120.

The user may also have selected the inclusion of children concepts. If so, each of the Concept Elements from the list obtained in Step 1110 is processed to determine whether a Child Concept Element exists. This is shown by Decision Step 1122 and Step 1124. The located Child Concept Elements are added to the list. The user is then allowed to remove any identified elements from the list before continuing with the search, as shown in Step 1126. This process is repeated for each additional level of hierarchy to be included in the search, as is shown by Decision Step 1128. For each identified Concept Element, any existing "AppliedTo" Relationship is traversed to locate an associated Asset Element, as illustrated in Step 1130, and an Asset Element list is created.

One skilled in the art will recognize that other embodiments of the above-described search process exist. For example, any existing "applies to" relationship could be traversed prior to obtaining a complete set of Concept Elements. Alternatively, the Element Locator 124 could be allowed to execute without any human intervention so that no filtering of concepts is performed as new Concept Elements are located.

Element Locator uses calls to the AIM EXE 232 service "Get Elements" to retrieve the elements from Element Inventory 102. As discussed above, this service can be called with a number of options. It can locate an element based on the stored content of the element, or based on a specified element name identifier, or based on relationship data that may have been read from a previously-retrieved element. The relationship data is used to traverse the various branches in the tree hierarchy.

Expanding a List of Initially-Located Asset Elements

The Element Locator 124 is used to find a set of Asset Elements related to one or more concepts of interest. This initially-located set may be expanded to include related Asset Elements. In this manner, a functional set of Asset Elements can be identified, and in turn, the associated code, data, and system modules can be located and used as a package. This package may become the target of a renovation or transformation operation.

The set of initially-located Asset Elements can be expanded in a number of ways. The user may use Element Viewers 144 to locate element information, and in some cases, graphically view selected ones of the identified Asset Elements. For example, one of the functions provided by Element Viewers 144 in FIG. 1 is the Relationship View, which allows a user to obtain a graphical display of an element, and to further graphically view any existing relationships and related elements. This view allows the user to navigate these relationships within the graphical display so that a chain of elements and element relationships can be traversed.

Figure 12:
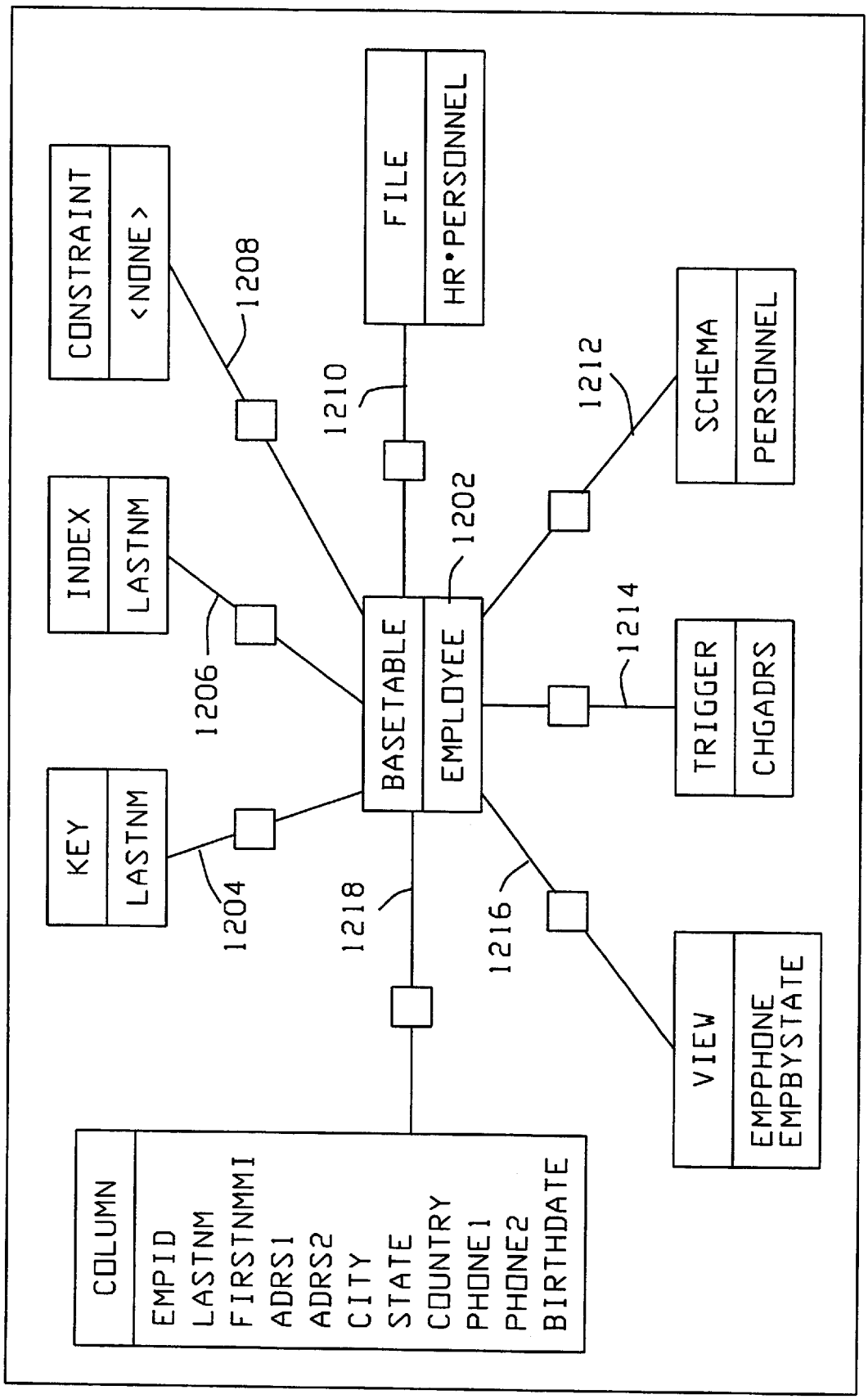
FIG. 12 is an illustration of Relationship View provided by Element Viewers using the element instances shown in FIG. 5.

FIG. 12 is an illustration of Relationship View provided by Element Viewers 144 using the element instances shown in FIG. 5. Element "Employee" 1202 of type "BaseTable" is the selected element, with all relationships associated with this element shown as Lines 1204–1218. The associated Asset Elements are shown on the periphery interconnected to Lines 1204–1218. The Relationship View user interface allows the user to make any of these peripheral Asset Elements the selected element such that the newly-selected element is displayed in the center of the screen with all its associated relationships and related elements.

Element Viewers 144 further includes an Affinity View, which allows the user to determine which elements are associated with a selected focus element. A selected Asset Element is displayed at the left of a display screen, with the relationships and interconnecting elements fanning out to the right.

Figure 13:
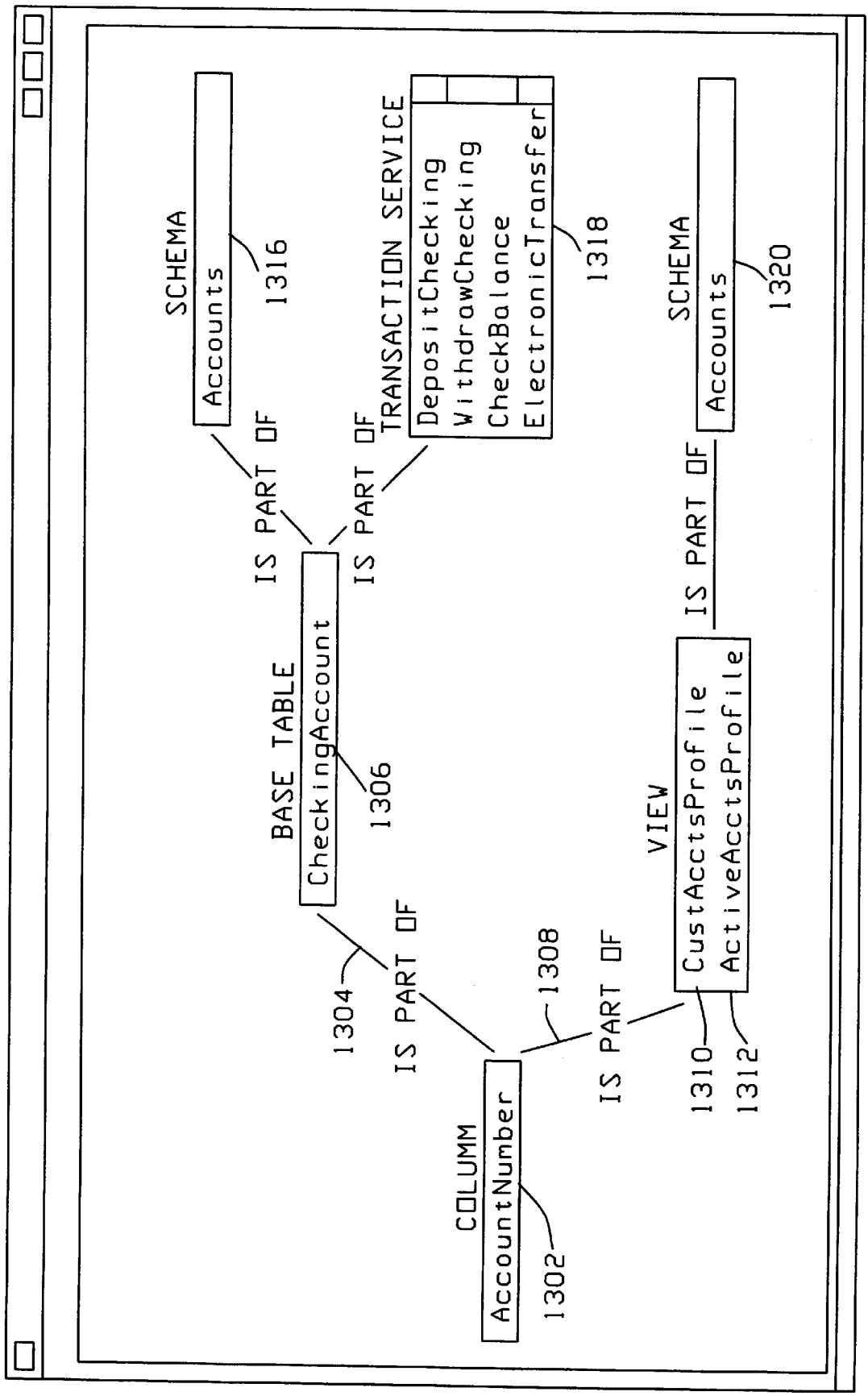
FIG. 13 is an illustration of Affinity View provided by Element Viewers.

FIG. 13 is an illustration of Affinity View provided by Element Viewers 144. The selected Asset Element is shown as element "Account Number" 1302 of Element Type "Column". Element Account Number 1302 has a relationship "is part of" 1304 with Asset Element 1306 of Element type "Base Table", and further has relationships "is part of" 1308 with Asset Elements 1310 and 1312 of element type "View". In a similar manner, the relationship chain continues to include the Asset Elements shown in Windows 1316 and 1318, and that are related to Asset Element 1306. The display further includes the Asset Element in Window 1320 that is related to Asset Elements 1310 and 1312.

Another tool that may be utilized to create a package of Asset Elements from the initially-located set of Asset Elements in the Element Packager 118. Element Packager requires as an input parameter a list of Asset Elements, which may be created by Element Locator 124 in the manner described above. Element Packager uses this list to automatically locate any and all other Asset Elements that are related to this list of elements. A display is provided of the newly-located elements that graphically depicts the manner in which the located elements are related to the initial set of elements. The user is allowed to selectively remove elements from the list of newly-located elements, and to thereafter repeat the process to further locate any additional elements related to the most-recently located list of elements. Any number of iterations may be performed until a user has determined the desired set of Asset Elements. The set of elements is packaged into a reusable set that may thereafter be utilized to perform renovation or transformation operations.

Defining Element Mappings

The Application Domain and the related Lexicon, including the Word and Word Variant Elements, are initially created when the Object Management System is installed by system administrators, which occurs as follows. First the model of element types is loaded into the EIS 103. Then a base set of Locator Elements is loaded into Element Inventory 102 via the AIM EXE 232 using file I/O, as shown on line 240 of FIG. 2. This includes the Concept, Word, and Word Variant Elements that are required to support the needs of the user based on the IT mission of the user system. In the preferred embodiment, elements are loaded in groups such that all Concept, Word, and Word Variant elements related to the same element of type "Application Domain" 618 are loaded together. Each group of elements of this nature will be associated with a broad application area, such as "Banking". Various ones of these groups of elements are available commercially from the Unisys Corporation as separate "Application Domains". The user may also select to have an Application Domain created and loaded that reflects the element type definitions provided by the EIS 103. An exemplary Application Domain of this type is shown in Block 932 of FIG. 9.

After initialization of the Element Inventory 102 and the EIS 103, Asset Elements are created and stored within Element Inventory 102. In the preferred embodiment, each Asset Element is one of the predefined asset element types defined by the model. As discussed above, Asset Element creation will generally be performed using a variety of discovery tools that are synchronized with the model in the EIS. Each of these tools is capable of automatically analyzing a specified body of software constructs, creating Asset Elements of the types defined by the model, and thereafter generating the meta-data contained in the newly-created Asset Elements. The Fulcrum program commercially-available from the RMC Corporation is an example of this type of tool, and is capable of creating a knowledge base for Cobol code components.

After the installation of the base set of Locator Elements, Locator Elements may further be created and modified using such tools as Element Viewers 144 of FIG. 1 accessible via Interactive Tools 259. This allows a user to customize the Lexicon to meet the specific needs and conventions of an IT organization. In the preferred embodiment, Element Explorer View of Element Viewers 144 allows a user to create an element of any selected element type. This functionality is supported by various calls to the AIM EXE 232 such as the "Create Element" service call discussed above.

Figure 14:
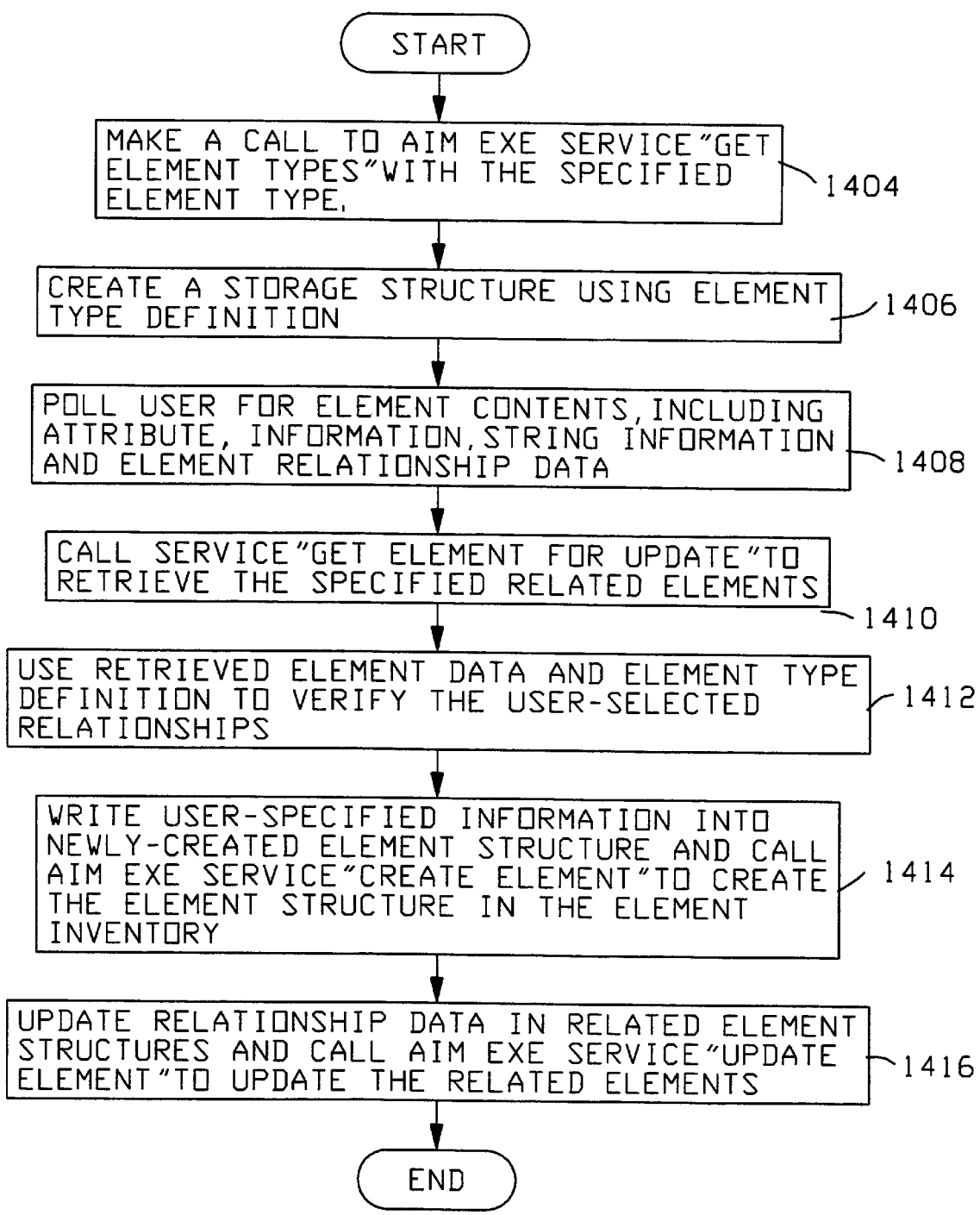
FIG. 14 is a flowchart of the process used to create a new element.

FIG. 14 is a flowchart of the process used to create a new element. Element Viewers 144 makes a call to the AIM EXE 232 service "Get Element Types" with the element type specified by the user, as shown by Block 1404. The called AIM EXE service retrieves the type definition from the EIS 103 and provides it to the Element Explorer View. A template of a storage structure for the desired element type is created based on the element type definition, as shown in Block 1406. Then Element Explorer View polls the user for the attribute and relationship information that will be stored in the newly-created element, as shown in Block 1408. In the preferred embodiment, the content information is supplied as string data. The relationship information can be supplied in terms of the unique identifiers that name the elements to be related to the current element. After the user supplies the related element name(s), the specified element structure(s) is/are retrieved from the Element Inventory 102 using one or more "Get Element for Update" service calls, as indicated in Block 1410. The element type definition for the newly-created element will indicate, for that element type, the legal relationship types that may be formed, and will therefor also indicate the element types that may form relationships with that element type. Using this information, and the element type specifications from the elements retrieved in Block 1410, the relationship(s) to be created are verified as being legal relationships, as indicated by Block 1412. If the specified relationship(s) are legal, relationship data is created and stored in the newly-created element, and the element is stored in the Element Inventory 102 using a "Create Element" service call as shown in Block 1414. In the preferred embodiment, a relationship is recorded using relationships between objects stored within the ERM 226 of the Element Repository 220, wherein these relationships are supported by the UREP object-oriented repository referenced above. Within the UREP, the relationships are implemented using pointers, but could be implemented in other ways as well. The contents of the related element(s) are also updated to reflect the newly-created relationships, and the modified elements are written to the Element Inventory 102 using an "Update Element" service call, as shown in Block 1416.

In addition to providing the ability to create new elements, Element Viewers 144 also provide a "modify" function which allows users to specify new relationships between existing elements, or change the string data stored within an element.

Figure 15:
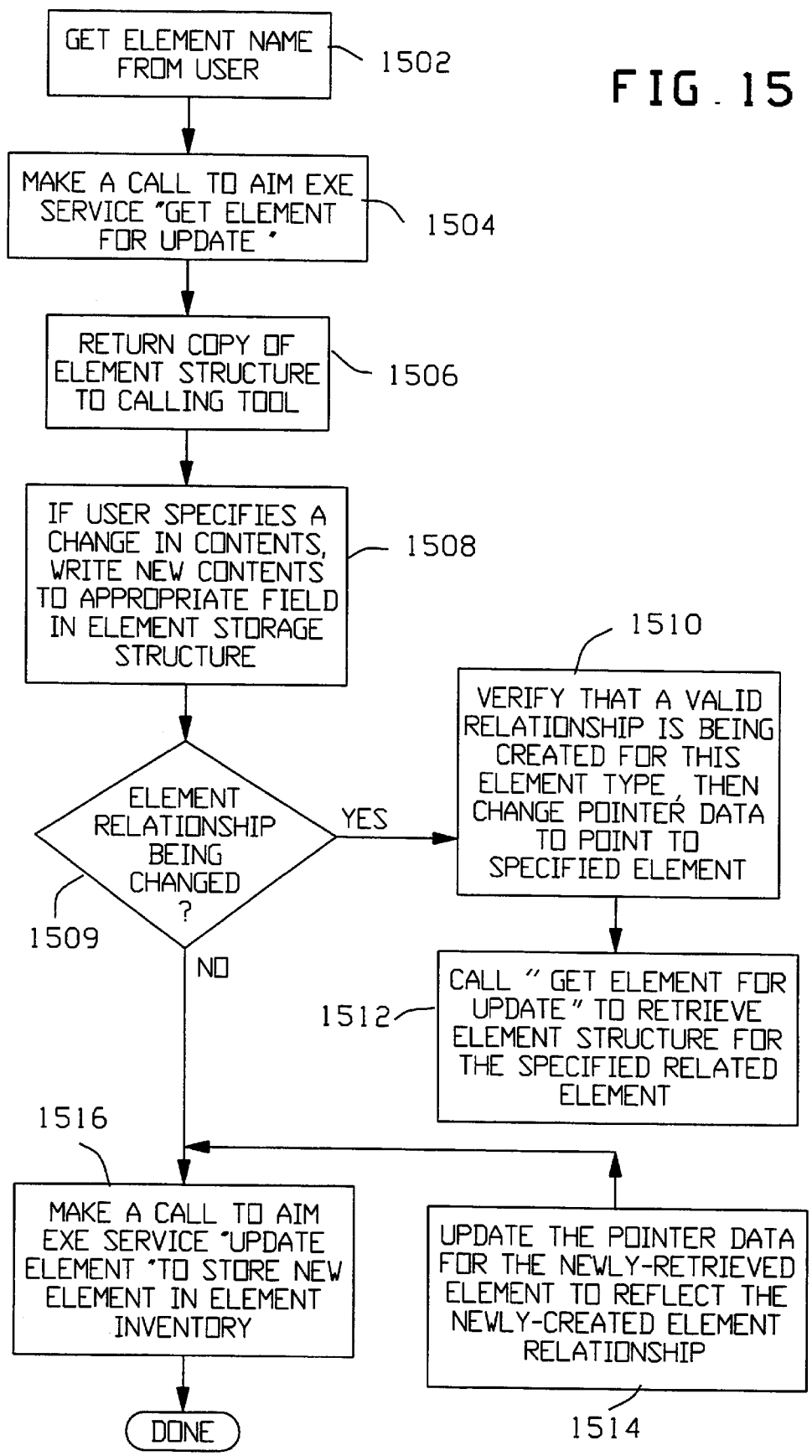
FIG. 15 is a flowchart of the process used to implement the element modification function provided by Element Viewers.

FIG. 15 is a flowchart of the process used to implement the element modification function provided by Element Viewers. The name of the selected element is first obtained from the user as shown in Block 1502. A call is made to the AIM EXE Service "Get Element For Update" as shown in Block 1504. This returns a copy of the contents for the specified element if such an element exists as shown in Block 1506. Otherwise, an indication is provided that no element of that name was located, and the message is passed to the user. The user is allowed to change the attributes and relationships of the element as shown in Block 1508. The user interface polls the user for new string data, and for any relationship changes. Relationships can be created or deleted for the specified element. If a new relationship is created as indicated in Decision Step 1509, the relationship must be verified based on the element type definition, as shown in Block 1510. Additionally, the new element relationship must also be recorded in the related element. This means the other related element storage structure must also be retrieved if it hasn't already, as indicated in Block 1512. The contents of the related element are updated to reflect the newly-created binary relationship, as illustrated in Block 1514. Finally, a call is made to the AIM EXE service "Update Element" with the names of the elements to update, as shown in Block 1516. This call updates the Element Inventory 102.

Finally, Asset Elements may also be created in a manner that is similar to that described above with respect to Locator Elements. In one embodiment, when an Asset Element is created using Element Viewers 144, the user is provided with the option to create a relationship of type "applies to" 634 with a Concept Element storing a concept indicative of the element type for the newly-created Asset Element. (This capability assumes, of course, that an Application Domain of the type shown in Block 932 of FIG. 9.) This can be best shown by returning to the example of FIG. 9. If Asset Element "PayrollDep" 938 were newly-created, Element Viewers 144 will poll the user on whether an "applies to" relationship is to be created with Concept Element 936 indicative of the concept "HVTIP". The Element Viewers 144 utilize a relationship existing between the element type definitions from the EIS and the respective Concept Element to determine which Concept Elements are related to which element types. As discussed above, the use of an Application Domain indicative of element types provides users with a way to associated part of the Lexicon with element type definitions from the EIS.

Figure 16:
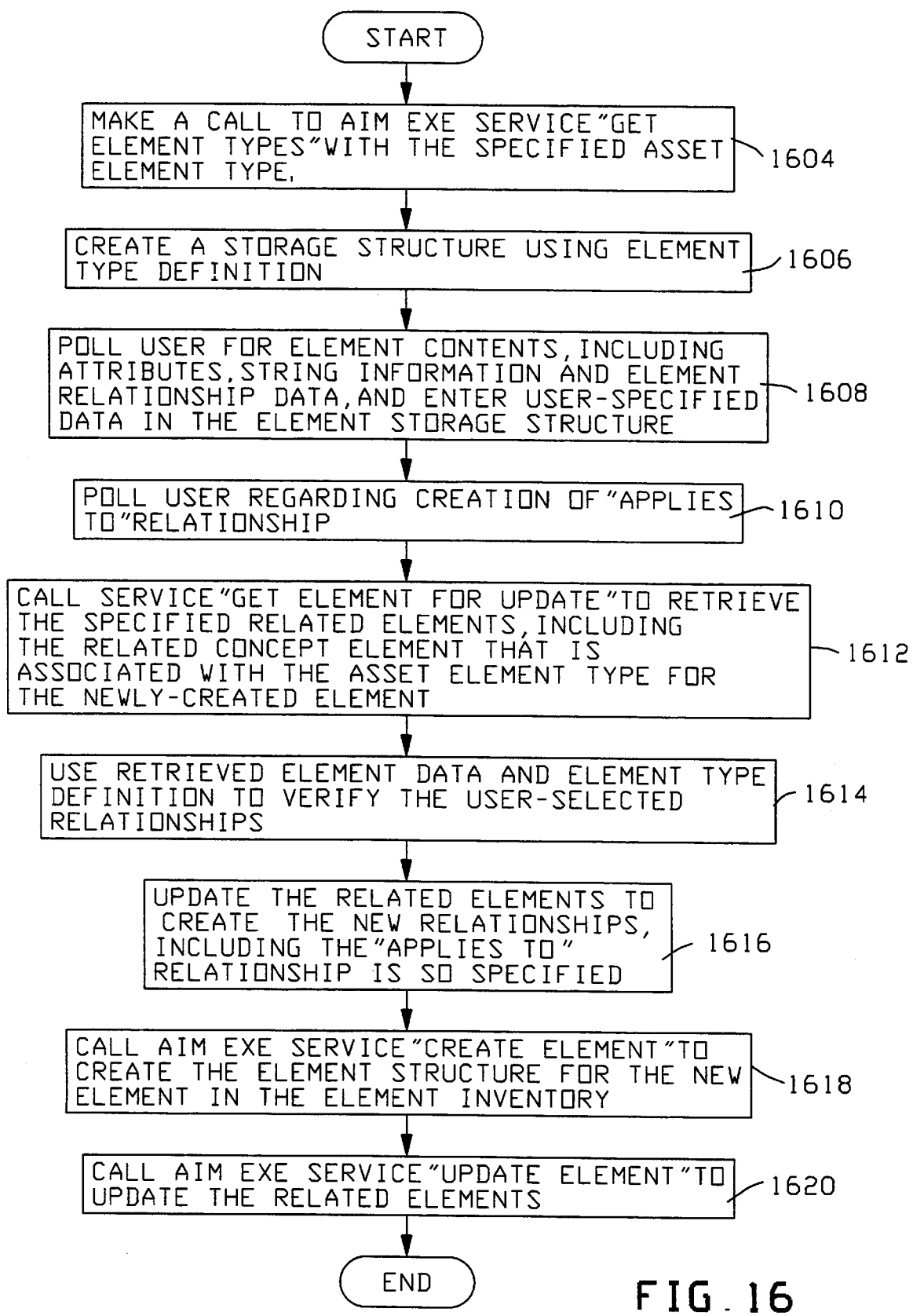
FIG. 16 is a flowchart of the process that may be used to create the "applies to" relationship for a newly-created Asset Element.

FIG. 16 is a flowchart of the process that may be used to create the "applies to" relationship for an Asset Element. Element Explorer View of Element Viewers 144 makes a call to the AIM EXE 232 service "Get Element Types" with the Asset Element type specified by the user, as shown by Block 1604. The called AIM EXE service retrieves the type definition from the EIS 103 and provides it to the Element Explorer View. A template of a storage structure for the desired element type is created based on the element type definition, as shown in Block 1606. Then Element Explorer View polls the user for the attribute and relationship information that will be stored in the newly-created Asset Element, as shown in Block 1608. The relationship information can be supplied in terms of the unique identifiers that name the elements to be related to the current element. Next, the user is polled regarding whether a relationship of type "applies to" should be created for the newly created Asset Element, as shown in Block 1610. After the user supplies the requested information, the specified element structure(s) is/are retrieved from the Element Inventory 102 using one or more "Get Element for Update" service calls, as indicated in Block 1612. This includes the retrieval of the Concept Element associated with the element type of the newly-created Asset Element, if the user specifies that the "applies to" relationship is to be created.

As discussed above, the associated Concept Element is retrieved using a relationship created between the associated Concept Element and the element type definition provided by the EIS. Next, the specified relationships are verified using the element type definition for the newly-created element. This is shown in Block 1614. If the specified relationship(s) are legal, relationship data is created and stored in the elements, as shown in Block 1616. The newly-created element is stored in the Element Inventory 102 using a "Create Element" service call as shown in Block 1618. The contents of the related element(s) are also updated to reflect the newly-created relationships, and the modified elements are written to the Element Inventory 102 using an "Update Element" service call, as shown in Block 1620.

Having described an exemplary embodiment of the invention in the drawings and accompanying description, those skilled in the art will recognize that various modifications to the exemplary embodiment could be made without departing from the scope and spirit of the claims set forth below.

What is claimed is:

1. For use in a system having a memory for storing modules containing data signals, each of the modules being identifiable as a respective type of software construct for performing one or more functions, an object management system for managing the modules, comprising:

a first memory to store asset elements, each of the asset elements comprising data signals descriptive of a respectively associated one of the modules; and a second memory coupled to said first memory to store locator elements, each of said locator elements including concept signals indicative of a respective one of the one or more functions, each of said locator elements further comprising first relationship signals indicative of one or more first relationships, each of said first relationships existing between said each of said locator elements and a respectively related other one of said locator elements, at least one of said locator elements further including second relationship signals indicative of a second relationship between said at least one of said locator elements and a respectively related one of said asset elements, wherein said at least one of said locator elements includes concept signals indicative of one of the one or more functions that may be performed by the module that is respectively associated with said respectively related one of said asset elements, and further including element locator means coupled to said second memory to search each of said locator elements to identify a selected one of said locator elements including concept signals indicative of a selected one of the one or more functions, said element locator means to further identify, for said selected one of said locator elements, any said respectively related one of said asset elements.

wherein said element locator means further includes selection means to selectably cause said element locator means to identify, for said selected locator element, one or more of said respectively related other ones of said locator elements, and to further identify for each of said respectively related other ones of said locator elements any said respectively related one of said asset elements, and user interface means to allow said selected one of the one or more functions to be provided as input by a user of the object management system, and wherein each of said first relationships forms a branch in a hierarchical tree structure having multiple levels, and wherein said element locator means further includes level selection means for causing said element locator means to identify predetermined ones of said locator elements located within said hierarchical tree structure not more than a selected number of said multiple levels from said selected one of said locator elements, and for further causing said element locator means to identify, for each identified one of said locator elements, any said respectively related one of said asset elements.

2. The object management system of claim 1, and further including display means coupled to said user interface means for displaying each of said identified ones of said locator elements prior to identifying any said respectively related one of said asset elements.

3. The object management system of claim 2, wherein said user interface means further includes control means to allow a user of said object management system to deselect any of said identified ones of said locator elements to prevent any said respectively related one of said asset elements from being identified.

4. The object management system of claim 1, wherein ones of said data signals included within each of said asset elements are element name signals indicative of a type of software construct performed by said module associated with said each of said asset elements, and wherein ones of said locator elements each stores, for said respectively related one of said asset elements, said element name signals.

5. The object management system of claim 1, wherein said management system further includes a third memory coupled to said first memory and to said second memory to store element type definitions, each of said element type definitions to define a type of asset element or a type of a locator element, and wherein each of said asset elements and each of said locator elements are associated with a respective one of said element type definitions.

6. For use with a data processing system having a memory coupled to an instruction processor, the memory to store modules, ones of the modules storing instructions to be executed by the processor, other ones of the modules storing data signals to be processed by the processor, each of the modules having one or more predefined interfaces to other ones of the modules, and each of the modules structured as an associated Predetermined software construct and being associated with one or more tasks to be performed by the data processing system, a computer-implemented method of managing the modules, comprising the steps of:

(a) defining as an asset element a group of data signals descriptive of a respectively associated one of the modules, wherein said grout of data signals is indicative of the type of software construct associated with said respectively associated one of the modules;

(b) defining as a locator element a group of concept data signals descriptive of a respectively associated one of the one or more tasks to be performed by the data processing system, and defining multiple ones of said locator elements, each to store ones of said conceit data signals being descriptive of a different associated one of the one or more tasks to be performed by the data processing system and further defining, for each of said multiple ones of said locator elements, locator relationship signals indicative of one or more relationships existing between said each of said locator elements and one or more other ones of said locator elements, and whereby said one or more relationships existing for each of said locator elements defines a multi-level hierarchical tree structure wherein each of said locator elements is a node in said multi-level hierarchical tree structure and each of said one or more relationships is a branch in said multi-level hierarchical tree structure (c) defining a group of relationship signals to be included within said locator element which are indicative of a relationship between said locator element and said asset element, and whereby said respectively associated one of the one or more tasks is mapped to said asset element, and is further mapped to said respectively associated one of the modules and defining multiple groups of said relationship signals, each to be included within a respectively different one of said locator elements, each being indicative of a relationship between said respectively different one of said locator elements and a respectively associated one of said asset elements, and whereby the one or more tasks described by said respectively different one of said locator elements is mapped to said respectively associated one of said asset elements, and is further mapped to said respectively associated one of the modules, (d) receiving as an input parameter a selected group of concept data signals;

(e) receiving as an input parameter a selected number of levels in said multi-level hierarchical tree structure;

(f) identifying one of said locator elements that includes said selected group of concept data signals;

(g) identifying all of said locator elements having predetermined relationships to the identified locator element located in step (f) and that exist not more than said selected number of levels in said multi-level hierarchical tree structure from said locator element identified in step (f);

(h) locating, for each of the locator elements identified in steps (f) and (g), any said respectively associated ones of said asset elements; and (j) identifying, for said respectively associated one of said asset elements, said respectively associated one of the modules.

7. The method of claim 6, wherein step (g) further includes the steps of:

(g1) providing a list of identified locator elements; and (g2) allowing for de-selection of any of said identified locator elements in said list, whereby said de-selection of any of said identified locator elements thereafter prevents any of said respectively associated ones of said asset elements from being located for a de-selected one of said locator elements.

* * * * *